United States Patent [19]

Feezor et al.

[11] 3,808,354

[45] Apr. 30, 1974

[54] COMPUTER CONTROLLED METHOD AND SYSTEM FOR AUDIOMETRIC SCREENING

[75] Inventors: Michael D. Feezor; Mack J. Preslar, both of Chapel Hill, N.C.

[73] Assignee: Audiometric Teleprocessing, Inc., Chapel Hill, N.C.

[22] Filed: Dec. 13, 1972

[21] Appl. No.: 314,816

[52] U.S. Cl. .......... 179/1 N

[51] Int. Cl. .......... H04r 29/00

[58] Field of Search .......... 179/1 N; 181/0.5 G

[56] References Cited

UNITED STATES PATENTS

| | | | |
|---|---|---|---|
| 3,237,711 | 3/1966 | Bates | 179/1 N |
| 3,392,241 | 7/1968 | Weiss | 179/1 N |
| 3,536,835 | 10/1970 | Rawls | 179/1 N |

*Primary Examiner*—Kathleen H. Claffy
*Assistant Examiner*—Jon Bradford Leaheey

[57] ABSTRACT

A plurality of what may be locally or geographically remote and separated hearing test centers each include precision programmed automatic audiometer means adapted to test the hearing of a single or plural number of individuals and audiometric data generation means adapted to transmit hearing test data by conventional telephone lines or other long distance linkage on a remote basis, and by direct wired connection on a local basis to a data processing center, there to be processed, evaluated and stored. Through the method of computer processing, storage, and retrieval, and local or remote communication of the test data, provision is made for screening the hearing of either single or plural individuals on a computer controlled and large scale basis.

32 Claims, 38 Drawing Figures

COMPUTER CONTROLLED METHOD AND SYSTEM FOR AUDIOMETRIC SCREENING

CROSS-REFERENCE TO RELATED APPLICATIONS

The present application is related to copending application, Ser. No. 306,351, filed Nov. 13, 1972, entitled "Programmable Audio Level Control Useful in Audiometric Apparatus", and to copending application, Ser. No. 315,173, filed Dec. 14, 1972, entitled "Precision Automatic Audiometer". The relation between the three applications is that Ser. No. 306,351 entitled "Programmable Audio Level Control Useful in Audiometric Apparatus," is directed to an attenuator or level control useful in an audiometer; Ser. No. 315,173, entitled "Precision Automatic Audiometer," is related to an audiometer utilizing such an attenuator, and the present application is directed to employment of such an audiometer in a method and system having computer control. Thus, the present application makes use of the subject matter of both of the other applications.

BACKGROUND OF THE INVENTION

1. Field of the Invention

The present invention relates to auditory testing devices and related screening systems for testing the hearing of a single as well as a plural number of individuals and particularly to auditory screening systems utilizing telephone lines or other long distance data communication means such as radio, microwave, or the like, to transmit test data from geographically remote and separately located testing locations to a data processing center for subsequent processing by computer.

2. Description of the Prior Art

Satisfactory hearing abilities are essential for the adequate performance of many tasks. In the field of industry, for example, employees must frequently work in very noisy environments. Machine noise can at times reach levels warranting the use of sound limiting headgear or engineering noise controls to prevent ear damage. In order to insure that the noise of machinery, etc., is not causing a threshold shift or possible irreparable harm to an employee's hearing, frequent and regularly scheduled hearing tests are desirable.

In the past, however, without undergoing a substantial investment in audiometric equipment, soundproof rooms, and trained personnel, regular hearing testing has largely been unavailable to small and moderate sized industries. In cases where an outside agency has administered the hearing tests, the tests have typically been highly infrequent, often lapsing over a year before subsequent tests. Thus, new employees hired immediately following a testing program may work in a harmfully noisy environment for a long period of time, virtually unnoticed, until a subsequent hearing test, administered a year after their initial employment, reveals a substantial hearing impairment. There have also been numerous instances in which employees working in extremely noisy environments have never had a hearing test and have relied, out of necessity, on such ineffective devices as cotton or improperly fitted earplugs to lessen the sound intensity without realizing the degree of permanent hearing loss they have already suffered.

In this respect, audiometric screening apparatus was developed to help determine which employees had normal hearing and which employees had a hearing impairment that should be examined more thoroughly. Pertinent prior art in the field of screening audiometers are U.S. Pat. Nos.: 2,781,416 entitled "Automatic Audiometer," 3,237,711 entitled "Audiometric Testing Apparatus," and 3,536,835 entitled "Auditory Screening Device." U.S. Pat. Nos. 2,768,236 and 3,536,835 are specifically directed to self-administered test apparatus, while U.S. Pat. No. 2,768,236 teaches the use of plural test booths situated in a soundproof test room, each booth having an earphone set and means to record the test responses at an operator console in an adjoining room. Likewise, U.S. Pat. No. 3,470,871 teaches a multiphasic screening room adapted by partitions to enable the simultaneous testing of a plurality of individuals situated about a central instrument room.

Relevant prior art in audiological mass screening has further been directed to mobile units including vans, or the like, equipped with audiometric apparatus, testing rooms utilizing multiple loudspeaker configurations to deliver test tones and seating a large number of test individuals, and audiometers having a plural number of earphone sets. For example, U.S. Pat. No. 2,768,236 is representative of the use of loudspeakers, while U.S. Pat. No. 2,511,482 teaches the concept of utilizing a plural number of earphone sets in combination with a recorded hearing test source, to achieve the mass screening result. However, the testing is limited to the number of earphone sets which may be practically employed. The free field radiation method employed according to U.S. Pat. No. 2,768,236 does not lend itself to calibration. The decibel level perceived depends on the subject's seating position and changes of head position. Furthermore, recorded sound disks are subject to significant amounts of wear, imparting extraneous noise onto the test sequence rendering the hearing test less and less accurate as the recorded material ages. While the prior art has taught various means for the simultaneous testing of a plural number of individuals at a test center, it has not suggested the use of distantly remote testing centers communicating by telephone line or other long distance link with a central data processing center. In addition, testing centers utilizing the multiphasic concept of administering a variety of tests to a plural number of individuals situated in individual soundproof booths or other noise excluding means, have been characterized by excessively high costs of fabrication due to the necessary soundproofing of the test instruments away from the test booths. These rooms of soundproof construction have, on the average, cost one hundred dollars per square foot.

The use of the above mentioned mobile audiometric installations in vans or the like has also been characterized as being extremely expensive, some vans costing over fifty thousand dollars to build and equip. In addition, sensitive equipment housed therein is constantly subject to road bumps and, therefore, requires frequent calibration and often replacement of damaged components. A further problem has been to effect adequate ventilation of the mobile units without allowing substantial amounts of external noise from being heard inside during the test. In this respect, if once at the test location, the van is not parked in a suitable isolated spot, there is the likelihood that noise being generated by passing trucks, cars, airplanes, and trains will be heard as background to the test material and will, therefore, tend to mask the actual test tones, causing the test subject to give erroneous responses to the test tones, and invalidating the hearing test. Furthermore, once the mobile typical unit leaves the location, it seldom returns for many months. Thus, no means to test new employees or to maintain an ongoing hearing conservation program are available.

What was once only a growing concern for safe hearing levels in work environments has recently been underscored and intensified by the passage of the Department of Labor's Occupational Safety and Health Act of 1970 which sharply delineates Federal standards regarding exposure of workers to noise. Industries having workers exposed to a noise environment of 90 dBA or greater are now required to reduce the noise level through engineering controls or, as an interim measure, provide hearing protection to the worker through the practice of administrative controls, ear protectors, and the instigation of an effective hearing conservation program. These standards and methods of compliance are outlined in "Guidelines to the Department of Labor's Occupational Noise Standards for Federal Supply Contracts," Bulletin 334, which is scheduled for revision during 1972.

As indicated above, basic to any control is the hearing testing program which must provide pre and post employment audiograms along with a continuous monitoring of the workers' hearing so long as they are employed in high noise areas. No particular emphasis has heretofore been placed on how the workers are to have their hearing screened except that in all instances the employer is responsible for any hearing loss incurred on the job by the worker. In order for a hearing conservation program to be effective, however, trained personnel are essential in supervising and conducting the testing. Herein lies one of the greatest problems in conducting an effective hearing conservation program: obtaining enough clinically certified audiologists to assist in collecting and evaluating data as well as general supervision. In the United States there is presently only one clinically certified audiological clinician per 12,500 citizens. This figure is wholly inadequate considering the amount of testing required. For example: using present audiometric apparatus and techniques, it would take a hospital having a comparatively large staff of three clinically certified audiologists over a year to test the employees of a typically large industrial plant numbering, say, 12,500, just one time.

Basic to any audiometric system designed for large scale screening is the employment of a trouble free and programmable level control or "attenuator" as such circuits are more frequently referred to. In the companion copending application, Ser. No. 306,351, entitled "Programmable Audio Level Control Useful In Audiometric Apparatus," there is disclosed a level control which is uniquely adapted to the system and method of the present invention. Since the level control plays such a significant role, a brief summary of the prior art dealing with attenuators is next given and more prior art details may be found by referring to the subject copending application, Ser. No. 306,351, "Programmable Audio Level Control Useful In Audiometric Apparatus."

In the field of audiology, it has frequently been useful to combine a potentiometer or attenuator with a motorized drive mechanism in an audiometer, so as to continuously vary the amplitude level of a given signal at a given frequency, and in so doing ascertain a given person's hearing threshold. This is especially the case in audiometers and audiological devices which operate in accordance with the teachings of Von Bekesy, since these are adapted to be continuously swept over a wide dynamic range, e.g., 0–90 dB, in order to accurately determine the degree of hearing loss. In these types of audiometers and audiological apparatus, the programmable audio level control devices employed have largely been directed to electromechanically operated potentiometers.

Other apparatus commonly employed to test hearing have not required that the signal be continuously swept through a given decibel range, but rather have employed stepping switches, relays, and the like, to incrementally vary the sound pressure level an examinee is hearing in a stepwise fashion. This type of sound attenuating device also lends itself to being programmed by appropriate logic means. The Grason-Stadler Corporation, for example, has recently made publicly available a digitally programmable attenuator utilizing a plurality of fixed resistive attenuators switched in a binary sequence.

Since the potentiometric attentuators presently in use are mechanical in nature, they are subject to wear and deterioration and to producing "noise." Due to the presence of excessive switching transients between attenuative steps, even a digitally-operable attenuating device of the type mentioned is unsuited for continuous level sweeping without means of blanking signal output during switching intervals. The addition of such spurious noises will add to the input signal frequency causing the test examinee to respond to sounds other than the controlled test frequencies, and thus invalidating a hearing test.

The problems of electromechanical attenuators and potentiometers have led to the use of electronic components which can be electrically programmed and which have no moving component parts to wear. Heretofore, these electronic components have been directed to electrically altering the resistance of a circuit element, and have included such devices as the field effect transistor (F.E.T.), various diodes, transistors in which a bias current is adapted to induce variance in gain qualities, and the photo-resistor in which the amount of light falling upon the component is approximately inversely proportional to the resistance of the component. However, these devices have characteristically introduced electrical nonlinearity and distortion at some degrees of attenuation, functional nonlinearity, wherein the degree of attenuation in decibels is not directly proportional to the varying control voltage over a wide range of attenuation, e.g., 0–90 dB, and where transistors and diodes have been employed, have been characterized by temperature instability over long periods of operating time.

In the other companion copending application, Ser. No. 315,173, entitled "Precision Automatic Audiometer," there is disclosed an automatic audiometer which is defined as an audiometer which the examinee may use in conducting a self-administered hearing test at some local site. The system and method of the present invention use an audiomatic audiometer, as defined for the subject copending application, and for that reason some of the pertinent history of the prior art dealing with automatic audiometers as set forth in the copending application is useful to an understanding of the present invention and is now set forth.

An automatic audiometric self-administered hearing test is performed by an instrument designed to present automatically changing tone frequencies while the degree of sound intensity of the signal is controlled by the examinee, the entire test sequence being simultaneously recorded on a synchronously coupled automatic recorder. The earliest automatic audiometer was developed by Bekesy and improved by Reger. Reference is made to Georg von Bekesy, "A New Audiometer," Acta Otolaryngologica, Vol. 35 (1947), pages 411–422, and Scott N. Reger, "A Clinical and Research Version of the Bekesy Audiometer," Laryngoscope, Vol. 62, (December, 1952), pages 1333–1351. In accordance with the teachings of Bekesy, a motor driven pure tone oscillator is swept from the lowest to the highest test frequency in a continuous progression. An attenuator or level control comprising, for example, a potentiometer, is driven by a reversible electric motor, the direction of which is determined by a push button switch operated by the examinee. The examinee is instructed to push the button as long as he hears the signal and keep it depressed until it fades from audibility, then to release it immediately. The tone will then fade into audibility again and the earlier process is repeated. The examinee then listens for the test tones through appropriate earphones. Upon his hearing the test tone and depressing the button, the motor causes the attenuator to decrease the intensity of the signal being output through the earphones; when the button is released, the motor reverses itself and starts an increase in the intensity of the output signal. An ink writing recorder usually coupled by gears, chains, and the like, to the attenuating and frequency sweeping mechanisms of the audiometer, traces out an audiogram representing the examinee responses to the various test tones presented. Note, for example, U.S. Pat. No. 2,563,384 which teaches an apparatus embodying an automatic audiometer according to Bekesy, synchronously coupled to a drum recording mechanism. As a further reference, a representative automatic audiometer based on the above teachings of Bekesy is manufactured by Grason-Stadler Inc., of West Concord, Massachusetts, and is designated Model E-800. This particular audiometer has found primary application in clinical diagnostic work and research.

An offshoot of the Bekesy clinical and research audiometer is the automatic screening audiometer widely used in industrial and military testing programs. The major difference between the Bekesy automatic and the screening automatic audiometers is that the latter uses discrete frequencies, usually 500, 1000, 2000, 3000, 4000, and 6000 Hertz, instead of the continuous frequency sweeping taught by Bekesy. The automatic screening audiometer in operation dwells on each of the above frequencies for approximately 30 seconds, automatically switches to the opposite ear and repeats each of the frequencies. During the 30-second test interval the examinee uses the manual push button to trace his hearing threshold on a suitable chart or drum recording instrument. This type of audiometer is commonly referred to as the Rudmose Recording Audiometer. Reference is made to R. F. McMurray and Wayne Rudmose, "An Automatic Audiometer for Industrial Medicine," Noise Control, Vol. 2 (January, 1956) pages 33–36. A representative example of this type of audiometer is sold by Tracor Electronics Company of Austin, Texas, and is designated Model ARJ-4. Several other firms have also recently introduced new industrial automatic recording audiometers; for example, Medical Measurement Instruments, Inc., Model 1000 and Grason Stadler, Inc., Model 1703. Reference is also made to U.S. Pat. No. 2,781,416 which teaches an automatic screening audiometer. Other prior art to be considered includes U.S. Pat. Nos.: 2,537,911, 2,781,416, 3,007,002 and 3,392,241.

As previously mentioned, the prior art audiometers referred to have introduced problems of noise, wear, misalignment, and have usually required special and relatively costly soundproofing facilities. Signal distortion and nonlinearity have been other problems. Calibration has been difficult to maintain, for many reasons.

It is apparent from the above that the recent Federal legislation regarding industrial noise has brought about an urgent need for an adequately supervised, easily conducted, and economical method and system for testing the hearing of a large number of individuals. Furthermore, there is a need for a method and system of conducting mass hearing tests using only a small number of clinically certified audiologists per substantially large number of test individuals. There is an even further need for a method and system for conducting accurate mass hearing tests and which can be readily and effectively implemented to better enable widespread and ongoing industrial compliance with the above environmental noise laws.

Solutions to the foregoing problems constitute objects of the present invention; and, as will be perceived, other objects and advantages will appear in the description and appended claims which follow.

SUMMARY OF THE INVENTION

The method and system of the invention are directed to means for testing the hearing of a single or a plural number of individuals at local testing locations or from a plurality of distantly remote testing locations and transmitting the test results via a local or a long distance communication link to a central data processing location for subsequent processing. Conventional telephone lines are used as such a link in the described system. A precision programmed audiometer situated at each test location is adapted by examinee operable controls to administer a hearing test to a single individual or to a plural number of individuals, and to simultaneously emit output data signals corresponding to the responses of each test individual.

Since the method and system of the invention exhibit their greatest advantages when directed to examining a plural number of individuals at geographically spread locations remote to a central control computer through use of a long distance telephone linkage, the remaining description will be based on such an application. However, it should be recognized that the description to follow generally applies where the individual or individuals being examined and the control computer are located in close proximity thus eliminating the long distance control and communication aspect of the invention.

The data signals are translated into digital format, are encoded into a format suitable for transmission via telephone lines and are transmitted to the central data processing location. Arriving at the data processing location, the signals enter a digital computer having storage capabilities which, upon the end of any remotely conducted test sequence, prints out the computed results by appropriate means, or alternately stores and prints out at a later predetermined time. Data signals being fed from the remote testing locations into the data processing location are constantly monitored for accuracy of transmission and abnormal signal deviations, ensuring accurate reporting of hearing test results to the computer. In addition, provision is made for the automatic correct calibration of signal level output at each remote test site, and means are also included for the remote testing of harmonic distortion, signal cross talk between earphones, frequency accuracy, and for the continuous monitoring of ambient noise levels in the immediate vicinity of each remote test site.

Each examinee listens to a predetermined sequence of test frequencies through suitable earphone transducers, one ear at a time, and controls the sound intensity of the various test tones being presented by a manually operable switch. A pre-programmed logic circuit is adapted to control the sequence of test frequencies presented by precisely regulating the amount of voltage being supplied a voltage controlled oscillator. A tone interrupter circuit is adapted to pulse the signals in rapid succession and at regular intervals. Prior to the administration of a hearing test, the examinee is instructed to press his switch upon hearing the test tone and to release the switch when the tone is no longer heard. A solid state ramp generator is adapted to supply either an increasing or decreasing ramp control voltage to a novel programmable solid state attenuator, whereby depression of an examinee-operated switch causes the sound intensity to which that respective examinee is being exposed to be automatically decreased by the attenuator, while release of the switch causes the sound intensity to be automatically increased. The ramp control voltage employed in the invention may be substantially linear in waveshape causing the signal to increase or decrease in intensity at a constant rate, or in a preferred form, may be non-linear in waveshape causing the signal intensities to increase and decrease rapidly at the onset of each presented test tone enabling a test subject to quickly seek his hearing threshold, and to slow the signal increase and decrease later during the tone presentation, enabling a test subject to more accurately maintain the sound intensity near his hearing threshold. During a hearing test, the examinee responses are monitored by sampling the control voltage emanating from the ramp generator and the various sampled voltages are transmitted through signal conditioning and interfacing means to a digital computer which temporarily accumulates the sampled data. Upon termination of the test sequence, the computer is adapted to compute the results in numerical form. Means are provided enabling a supervisor to initiate testing, to visually monitor the progression of the pre-programmed automatic test sequence, to override the sequence in the event of malfunction, and to identify each examinee with his respective computed test results.

A number of advantages of the method and system of the invention will be apparent to those skilled in the art. At the outset the invention provides a means for screening the hearing of individuals on a mass and geographically widespread basis in a manner not approached by any other known audiometric system or method. Standardization in the manner of both testing and recording results now becomes possible which in turn provides a basis for meaningful statistical and comparative data. The system lends itself to ease of calibration and to relatively precise measurements. Internal moving parts are completely eliminated as this has been a major drawback to conventional systems and methods. Because of the nature of the system the test hardware lends itself to compactness and to quietness in operation and may easily reside in the same room in which the examinations are given.

Figure 1:
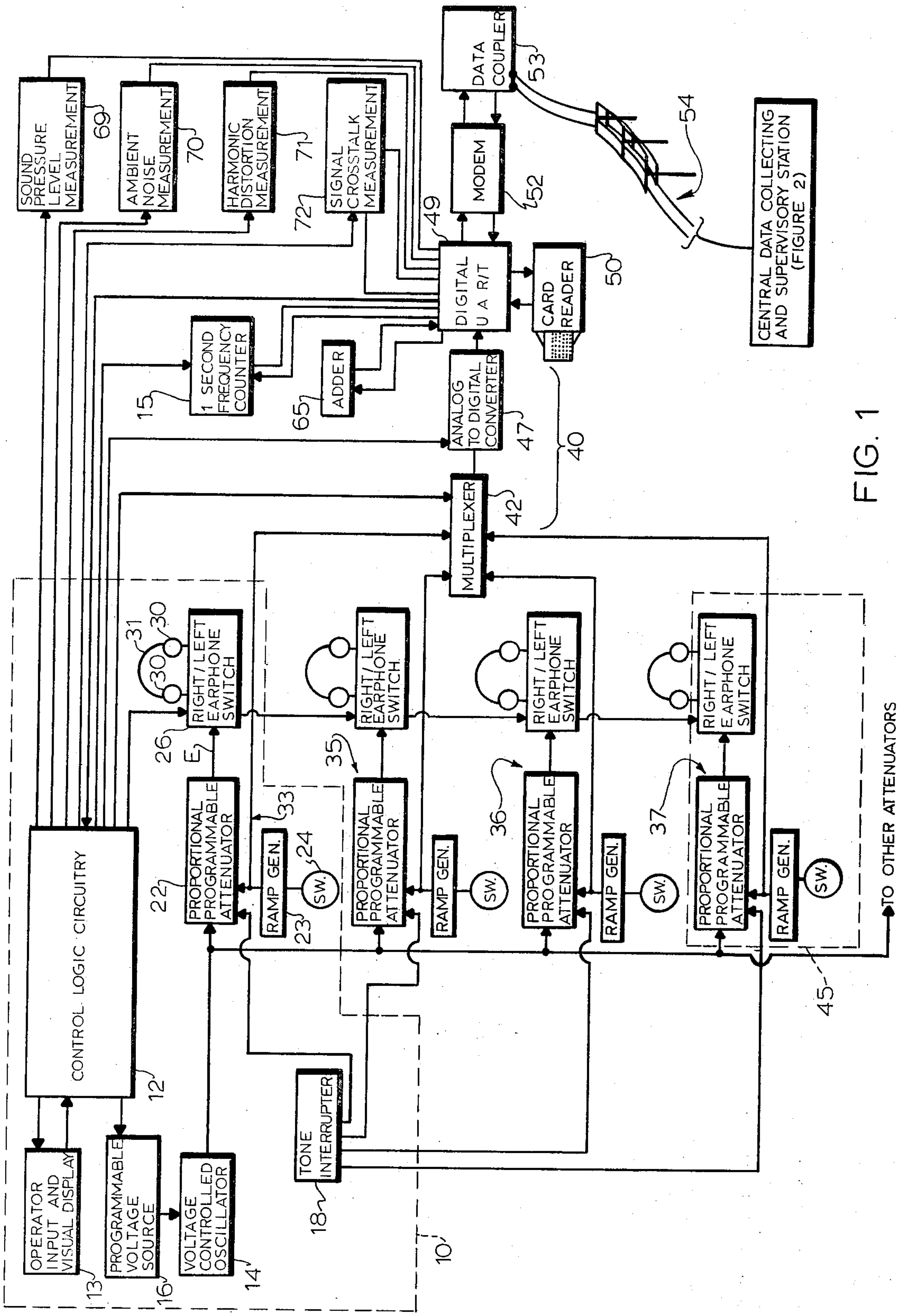
FIG. 1 is a schematic diagram of the portion of the system of the invention which is used at each test site and showing use of long distance telephone lines for communication according to a first embodiment.

In the drawings and descriptions the use of a bar indicates "not." For example, "$\overline{L}$" means "not left"; "$\overline{TEST}$" means "not test," etc., according to standard logic notation.

DESCRIPTION OF THE PREFERRED EMBODIMENTS

GENERAL CIRCUIT DESCRIPTION OF FIRST EMBODIMENT DESIGNED FOR WIDESPREAD PLURAL EXAMINEE TEST LOCATIONS

As previously mentioned, the present invention in the first embodiment is directed to a method and system for simultaneously testing the hearing of a plurality of individuals situated at a plural number of distantly remote and separately located testing sites, and transmitting the test results, via conventional telephone lines, to a central data processing location adapted to compute the results and print them out in appropriate form. Alternatively, the results may be stored for later retrieval.

The description to follow will first be directed to a somewhat general description of the first embodiment, then to a description of the level control useful in both embodiments then to a description of the second embodiment and to a more detailed description of the logic circuitry and other circuit elements which apply to both embodiments. As the description proceeds, it is well to keep in mind that the first and second embodiments are basically alike in construction and operation, the distinction being that the first embodiment is designed for long distance communication between the computer control and plural test stations whereas the second embodiment is shown designed for a relatively close communicating link such as patch cords and the like between the computer control and a single test station. The second embodiment is nevertheless adapted for plural examinee testing. Some of the description will necessarily be repetitive as to the two embodiments of the present invention.

It should be kept in mind that the level control explained here is also set forth and specifically claimed in separate co-pending application, Ser. No. 306,351, entitled "Programmable Audio Level Control Useful In Audiometric Apparatus." The reader should also bear in mind that the system of the present invention incorporates audiometer circuitry of the type separately described and specifically claimed in copending application, Ser. No. 315,173, entitled "Precision Automatic Audiometer."

Referring now to FIG. 1, the circuitry embodying the testing portion of the invention system, according to the first embodiment, includes an individual audiological screening device, represented by those components residing within dashed lines 10. Such a screening device is also disclosed and specifically claimed in co-pending application, Ser. No. 315,173, entitled "Precision Automatic Audiometer." This is shown to comprise a solid state control logic portion 12, later explained in detail, a function of which is to automatically regulate the sequence of tone frequencies presented during the hearing test in response to command signals emanating from operator input circuitry 13. Pure tone audio signals are generated by a variable voltage controlled oscillator 14 whose frequency corresponds to the amount of voltage applied by programmable voltage source 16. Tone frequency is adapted to be increased or decreased, either continuously or in a stepwise fashion, depending on the predetermined logic commands in control logic portion 12 which acts to regulate voltage source 16. The pure tone audio signal next enters a programmable level control or attenuating device 22 of the type disclosed and claimed in copending application, Ser. No. 306,351, entitled "Programmable Audio Level Control Useful In Audiometric Apparatus." Such a level control is adapted to vary only the amplitude component of the signal through electronic logging and exponentiating components, and in inverse linear proportion to the addition of a continuously variable control voltage from a ramp voltage generator 23. Since the amount of voltage flowing from generator 23 is proportional to the signal amplitude level, as previously disclosed in the above cited copending application, Ser. No. 306,351, it is possible to employ the variance in incoming control voltage to not only control the amplitude of the signal being produced through earphones 30, but also as a proportional measure of the actual sound pressure level to which test subject is exposed. A signal output 33 is therefore adapted to enable measurement of the voltage level passing through ramp voltage generator 23. The examinee operable control switch 24 is adapted to cause an increase or decrease at a predetermined rate in the amount of control voltage passing from ramp generator 23 and into the circuit. In this manner, the tone amplitude level correspondingly increases and decreases and is converted to pulse form by tone interrupter 18. The audio signal, having controlled frequency and amplitude characteristics, now enters a programmable electronic switch 26 adapted to direct the signal to one of the opposite earphones 30 in each earphone set 31. Earphones 30 are suitably calibrated to ANSI standards, and preferably include circumaural noise excluding cushions, which completely enclose the ear pinnae, and are adapted to help cancel environmental noise. The so-called "Audio Cups" fitted with MX-41AR inserts are made by Hearing Conservation, Ltd., Wembley, England, and are known to maintain calibration when properly used. Therefore, such earphones are preferred for use in the system of the invention and wherein the ambient noise does not require additional noise excluding measures.

GENERAL DESCRIPTION OF A HEARING TEST

Figure 32:
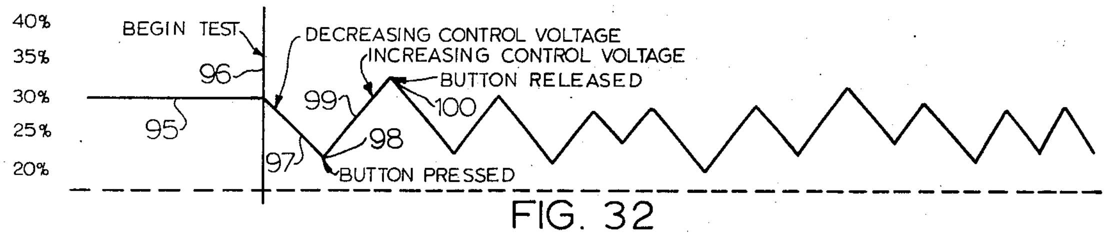
FIG. 32 is a generalized waveform of a typical pattern of ramp voltages generated during a normal hearing test in accordance with the present invention.
Figure 33:
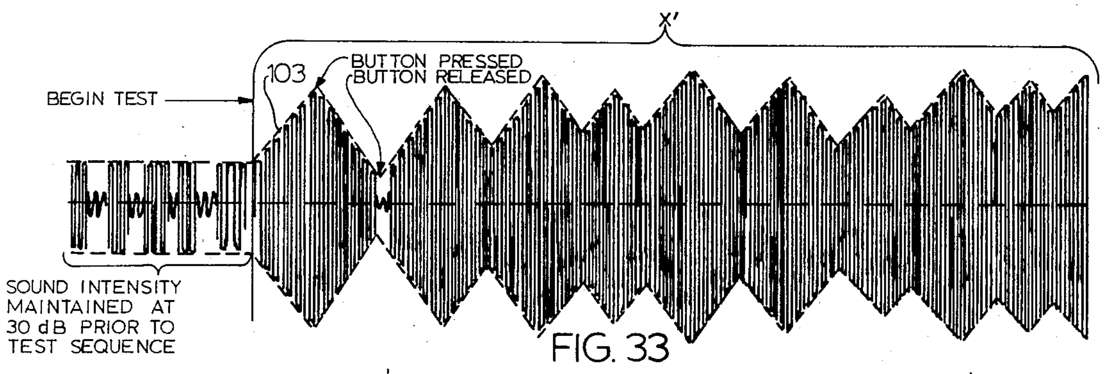
FIG. 33 is a generalized waveform showing the output sound pressure envelope corresponding to the application of a ramp voltage pattern shown in FIG. 32.
Figure 34:
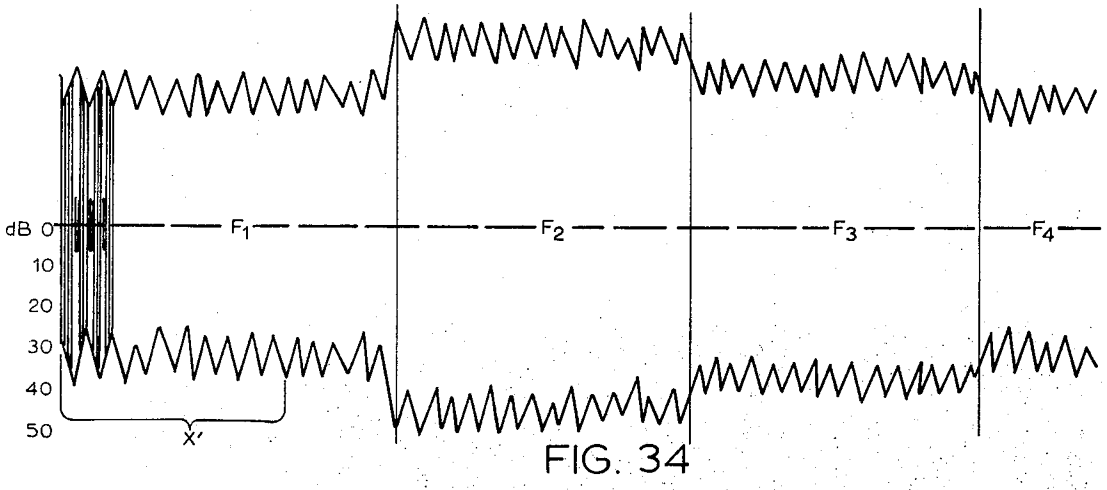
FIG. 34 is a generalized waveform showing typical sound pressure envelope patterns for different selected test frequencies.
Figure 35:
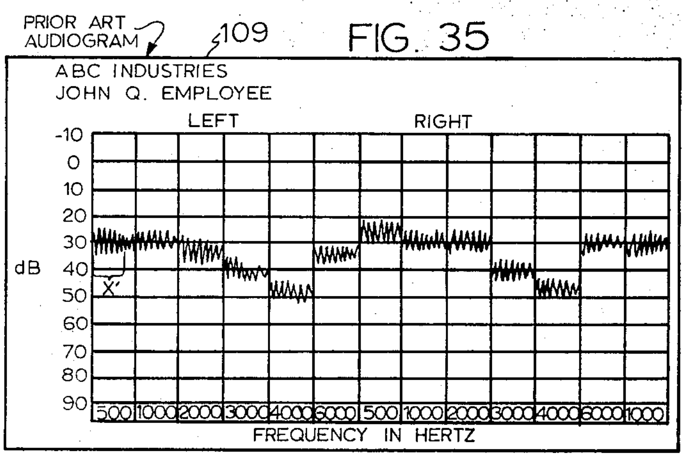
FIG. 35 shows a prior art audiogram, a portion of which is consistent with the output sound pressure envelope shown in FIG. 34.
Figure 36:
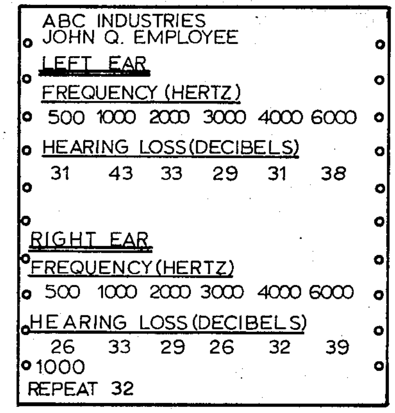
FIG. 36 shows a computer printout according to the present invention, a portion of which is consistent with the ramp voltage pattern shown in FIG. 24.

A better understanding of the functional operation of the present invention system may be had by first observing how a typical hearing test of one individual is conducted at a remote testing site. Therefore, before explaining the details of the circuitry and describing the operation of the system in full, the description of a typical test sequence which follows is believed helpful. During a hearing test, using only an individual screening audiometer as above described, a series of audio test tones of varying frequency and intensity or sound pressure level (S.P.L.) are presented to an examinee through his earphones. The examinee, in the example of FIG. 29, will be one of eight of such subjects. Earphones 31 are next properly placed on the ears of each examinee. Each examinee is then instructed to depress his control switch 24 when he first hears the tone, a point just above his hearing threshold due to reaction time. At the beginning of the test, the first tone is adapted to automatically rise in intensity. Once the examinee hears the tone, he presses his individual switch 24 causing the sound to decay. Reference is made here to FIGS. 32, 33 and 34. The sound gradually diminishes until he can no longer hear the tone. At this point, or just below his hearing threshold, he has been previously instructed to release the switch, which he does, causing the test tone to automatically begin a rising cycle again as best seen in FIG. 33. Due to reaction time, this point is just below his hearing threshold. The examinee proceeds to regulate the sound in a like manner for a predetermined length of time at each test frequency. Several rising and falling cycles are employed for each test freqeency designated $F_1$, $F_2$, $F_3$ and $F_4$. The entire test may comprise, for example, test tones of 500, 1000, 2000, 3000, 4000 and 6000 Hertz as indicated in FIGS. 34, 35 and 36. The series of tones are presented first through a left and then through a right earphone 30. The mean score of the sampled range of examinee responses as taken directly from the ramp generator output 33 closely approximates his hearing threshold for each respective frequency. The results appear as a computer printout as illustrated in FIG. 36 in comparison to the conventional audiogram shown in FIG. 35.

DESCRIPTION OF THE LEVEL CONTROL OR ATTENUATOR CIRCUIT

Of particular importance to the system and method of the present invention is the level control or attenuation circuit (identified by the numeral 22 in FIG. 1) and which is the subject of the separate copending application Ser. No. 306,351 , entitled "Programmable Audio Level Control Useful In Audiometric Apparatus." A description of the level control circuitry is repeated here with reference to FIGS. 8 through 22 in order that the same may be better related to the present invention. The level control being described is, of course, used in both the FIG. 1 type remote as well as the FIG. 23 type local system. Two embodiments of the level control circuitry are described.

In the following description it should be noted that an "attenuator" as used in connection with the description is a device acting only upon the amplitude component of a given signal, and which is capable of reducing or attenuating the amplitude of the given signal by a predetermined amount from a fixed maximum amplitude and therefore causing "positive" signal attenuation. An attenuator by mathematical definition may have either positive or negative attenuating characteristics, however, and thus a "negative attentuating device" is one which produces signal amplitude gain from a fixed minimum amplitude. It is in the latter "negative attenutating" sense that the term "attenutaor" is viewed as being consistent with the overall operation of the level control circuit. Note should also be made that by "maintaining linearity" is meant maintaining the signal free of amplitude distortion.

In both embodiments the level control or attenuator is characterized by having the output signal level, expressed in decibels, linearly related to the control voltage applied. The first embodiment, FIGS. 8, 9, utilizes three operational amplifiers in conjunction with other circuit elements to achieve the desired signal amplitude controlling result, while the second embodiment (FIGS. 16, 17 and 18), which is considered the preferred form of level control, utilizes as few as two operational amplifiers in conjunction with other circuit elements to control signal amplitude. The first embodiment will be initially described and it will be found helpful to refer back to FIGS. 1 and 23 to note how the level control components fit into the overall system. As the level control description proceeds note, for example, oscillator 14, voltage source 16, attenuator 22, ramp generator 23 and switch 24 in FIGS. 1 and 23.

Figure 8:
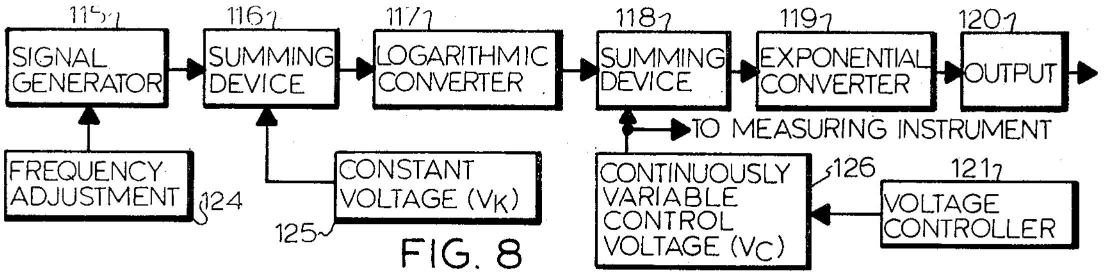
FIG. 8 is a generalized block diagram of one form of level control circuitry useful in the system of the invention.

Referring to FIG. 8, in the first embodiment a signal generator 115 having related frequency adjustment means 124 is adapted to generate an audio signal at predetermined frequency into an electronic circuit comprising: a summing device 116, adapted to combine the generated audio signal with an incoming constant direct current voltage supply 125; a functional logarithmic converter 117 adapted to compute the logarithm of the resultant sum; a continuously variable additive control voltage portion 126 including a suitable voltage source (not shown) and means 121 adapted to vary the magnitude and direction of said voltage source, said continuously variable control voltage being adapted to be combined with said generated logged signal by a summing device 118; an exponentiating portion 119 adapted to compute the antilogarithm of said last mentioned sum; and an output portion 120 adapted to remove the direct current component from said exponentiated signal yielding an output signal having precisely controlled gain qualities and which expressed in decibels is in direct proportion to said varying control voltage.

Figure 9:
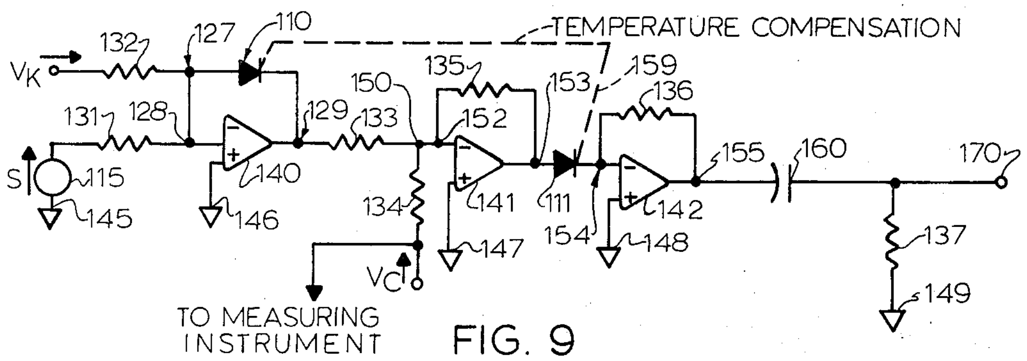
FIG. 9 is a somewhat schematic diagram of the first form of level control.

Referring now to FIG. 9, which schematically represents a circuit embodying the first embodiment of the level control circuit, a signal generator 115 is adapted to generate an input signal S at predetermined frequency, amplitude, and impedance throuh a first resistor 131 of matching impedance, and into a first computing amplifier 140. A constant regulated voltage supply $V_k$ provides current which flows through a second resistor 132 and enters computing amplifier 140 through junctions 127, 128. Computing amplifier 140 is adapted to compute the electrical sum of input signal S voltage and constant voltage Vhd k, in order to ensure that the magnitude of $S + V_k$ is always greater than zero, and that S is of unchanging polarity preparatory to logging and exponentiating operations. If the signal emanating from signal generator 115 is of unchanging polarity and is greater than zero, the addition of a voltage constant $V_k$ is omitted.

A first diode 110 in shunt configuration around amplifier 140 connects between junction 127 and the output lead of amplifier 140 at junction 129, and is adapted to compute the logarithm of the sum $S + V_k$. The signal, in log form, is then passed through a third resistor 133 and joined with incoming control voltage $V_c$ at junction 150. Control voltage $V_c$ is preferably regulated by appropriate solid state control means, e.g., a ramp generating analog or digital integrator, so as to yield a continuously varying voltage with equivalent rising and falling times and which can be activated by either manually operable controls, i.e., hand held switch 24, or by suitably programmable means, i.e., logic circuitry. The control voltage $V_c$ may, for example, be adapted to increase corresponding to release of a hand held switch, or to decrease corresponding to depression of said switch. Alternately, appropriate logic circuitry may be programmed and utilized to command the level control circuit to sweep through any attenuation sequence desried. Of special significance to the instant invention is the fact that the ramp generator may be readily adapted by additional circuitry later described, to emit a non-linear control $V_C$ enabling the sound intensity to increase or decrease quickly at the onset of a test tone and to increase or decrease at a gradually slowing rate during the rest of the tone presentation. Such programmed regulation of sound intensity rates enables a test subject to quickly seek his hearing threshold early in the tone presentation and to more accurately maintain the tone intensity near his hearing threshold for the duration of a tone presentation. Voltage $V_c$ is passed through a fourth resistor 134 and joins signal log $(S + V_k)$ at junction 150. The resultant combined signal passes into a second computing amplifier 141, adapted to compute the electrical sum of signal log $(S + V_k)$ plus $V_c$. A shunt circuit communicating between input 152 and output 153 leads of amplifier 141, includes a fifth resistor 135, adapted to maintain the correct low input bias voltage required by, and to determine the overall gain of amplifier 141. The resultant signal is fed into a second diode 111, and a third computing amplifier 142 which, together with diode 111, are adapted to perform exponentiation of the incoming signal. A shunt circuit connecting between input 154 and output 155 leads of amplifier 142 includes a sixth resistor 136 adapted to maintain the correct low input bias voltage required by and to determine the overall gain of amplifier 142. The resultant exponentiated signal is passed through capacitor 160 and resistor 137 which together remove the exponentiated direct current component of the signal, leaving a signal having the same frequency as the original signal S, but now having controlled gain qualities, with respect to signal amplitude. Appropriate grounding points 145, 146, 147, 148, 149 on the various components of the circuit, maintain the correct voltage polarity. In the particular circuit embodiment shown, the positive signal summing junctions are ground due to the signal inverting operations of the amplifiers employed. As represented by dashed lines 159, diodes 110, 111 are suitably temperature compensated by appropriate means, e.g., are embedded in a temperature conductive material such as epoxy. In an alternate version of the first embodiment of the level control, a pair of diode- or logarithm-transconductor-connected matched transistors having like functional qualities may be substituted for diodes 110, 111.

The operation of the level control circuit may be mathematically described in the following equations wherein use is made of the fact that for certain readily available silicon diodes operating over a wide range of forward currents, the voltage current relationship is very closely approximated by the well-known PN junction equation:

$$I_F = I_S(e^{qV/KT} - 1)$$

where $I_F$ = forward current of diode
$I_S$ = reverse or saturation current
$e$ = natural logarithm base (2.71828)
8 = ELECTRON CHARGE ($1.6 \times 10^{-19}$ coulombs)

V = applied bias voltage
K = Boltzmann's constant($1.38 \times 10^{-23}$ watt sec./°k)

T = absolute temperature °k
S = A sin wt

Reference is made to General Electric Transistor Manual, J. F. Cleary, Editor, Vol. 7, Chapter 1, "Basic Semiconductor Theory," pages 24–25. (General Electric Semiconductor Product Dept., Electronics Park, Syracuse, New York).

At room temperature (300°k) the equation reduces to $$I_F = I_S\ (e^{38.6V}-1).$$

For purposes of derivation in conjunction with the objects of the instant invention, it is assumed that for all logging and exponentiating diodes $e^{38.6V}>>1$. This inequality is adequately satisfied whenever V>.2 volts and under typical operating conditions of the invention circuit the forward diode voltage does not fall below 300 millivolts. Therefore, $I_F \approx I_S e(q^V/KT)$ or equivalently, $V = KT/q\ ln\ I_F/I_S$.

Based on the above approximation and referring to circuit diagram FIG. 9, the input signal at the summing junction of amplifier 140 is: $I_1 = V_K/R_{132} + (A \sin wt)/(R_{131})$ where A is the amplitude of the sine wave of frequency w, and where $V_K/R_{132}>A/R_{131}$ and $V_K>0$ always. The log converted signal Vhd Vat the output of amplifier 140 is then: $V_L = -(KT/q)\ ln\ I_1/I_{S_1}$. With a gain of −1, amplifier 141 is in an inverting summation configuration. Its output is then: $V_2 = (V_c/R_{134}) + KT/q\ ln\ I_1/I_{S_1}$. Voltage $V_2$ is applied across diode 11 and results in a forward current flow through that diode equal to:

$I_F \approx {}_{IS_2}\ e\ (q/KT)\ (-V_c/R_{134} + KT/q\ ln\ I_1/I_{S_1}\ ) = (I_S\ I_1/I_{S_1}\ )\ e\ (-qV_c/KTR_{134})$ , where $I_{S_1}$ and $I_{S_2}$ are the saturation currents of logging 110 and exponentiating 111 diodes respectively. In the foregoing derivation S is assumed to be a sine wave of amplifude A and angular frequency W as an example.

If the diodes are matched such that $I_{S_1}$ approximates $I_{S_2}$ over a given temperature range, and if they are maintained during operation at the same temperature by a thermal compensation means 159, i.e., embedded in epoxy or by other thermal conduction means, then the above equation reduces to:

$I_F \approx I_1\ e\ (-qV_c/KTR_{134})$, and the output voltage of amplifier 142 is given by $V_{OUT} = -R_{136}I_F \approx R_{136}I_1 e(-qV_c/KTR_{134})$. Expanding $I_1$ in terms of its definition, $V_{OUT} = [(V_k R_{136}/R_{132}) + (R_{136}\ A \sin wt/R_{131})]\ e\ (-qV_c/KTR_{134})$.

For $V_k$ varying slowly, the first term of the above equation contains only low frequencies which are removed by the action of the capacitor 160 and resistor 137 combination. The resulting net equation is therefore: $V_{OUT} = (AR_{136}/R_{131})\ e\ (-qV_c/KTR_{134})$. Converting this equation to base 10 where $ln 10 = 2.3$ or $lnx = 2.3\ \log_{10}x$ the resultant equation is: $V_{OUT} = (AR_{136}/R_{131})\ \exp_{10}\ (-qV_c/\mathbf{2.3}\ KTR_{134})$. Converting $V_{OUT}$ to decibels with respect to a given constant voltage, $V_{REF}$, the final output level is: $dB = 20\ \log_{10}\ (V_{OUT}/V_{REF}) = 20\ \log_{10}\ V_{OUT} - 20\ \log\ V_{REF} = [20\ \log_{10}\ (AR_{136}/R_{131})]-(+qV_c/2.3KTR_{134})-20\ \log_{10}\ V_{REF}$.

The first and third terms of the last expression are constant. At a constant temperature, the second term of the expression is directly proportional to $V_c$. This is expressed concisely by:

$$dB = K_1 + K_2\ V_c$$

where $K_1 = 20\ \log_{10}\ (A\ R_{136}/R_{131}V_{REF})$
and $K_2 = (-q/2.3\ KTR_{134})$.

From the above equations it is apparent that the functional logging and exponentiating techniques employed by the present invention circuit have the advantage of providing a linearly proportional relationship between the amount of control voltage $V_c$ applied, and the final output level in decibels of a given input signal S.

Figure 10:
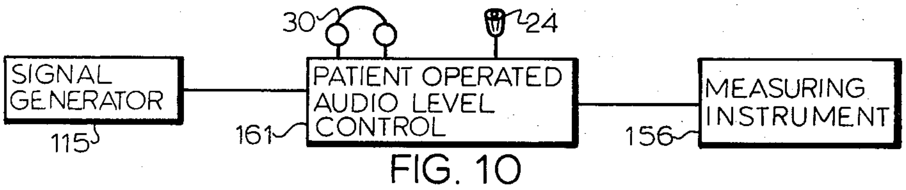
FIG. 10 is a block diagram showing the general relation of the level control to other components in a simplified hearing testing embodiment.

Referring to FIG. 10, there is shown a generalized circuit having a level control in accordance with FIGS. 8 and 9, generally designated 161 in FIG. 10, and combined with a sine wave generator 115, a continuous chart recorder 156, earphones 30, and an examinee switch 24 illustrating use of the level control circuitry in a hearing testing apparatus of the type wherein the test examinee controls the sound pressure level of the audio signal presented to him. Of course, the level control circuitry being explained here is applied in the same general way in the system and method of the present invention as broadly set forth in FIGS. 1 and 23. Under operating conditions over a frequency range of 500–6000 Hertz and a sound pressure level range of approximately 0 – 85 dB, the described level control circuitry has yielded accurate level control to within .14 dB. As explained elsewhere in connection with the system and method of the present invention, operation proceeds as the user listens through the earphones 30 until a signal becomes audible, then he depresses the control switch 24 until the signal becomes inaudible. The process is repeated at various frequencies to establish a hearing range at different frequencies for a selected individual, from which a figure of hearing loss or damage can be calculated. Note that with the use of such a level control circuitry this figure of hearing loss may now be obtained from the control voltage $V_c$ which is proportional to the output signal in dB. It is contemplated that small voltages be added to or deleted from the control voltage $V_c$ for each frequency being utilized to compensate for earphone deficiencies and the well-known Fletcher-Munson equalization curve. Such compensation is well-known to those skilled in the art and may be readily applied to the control voltage by appropriate circuitry.

Figure 11:
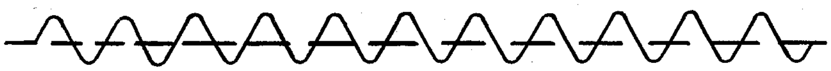
FIG. 11 is a generalized waveform representing a typical input audio signal.
Figure 12:
FIG. 12 is a generalized waveform representing a typical input audio signal logarithmically converted.
Figure 13:
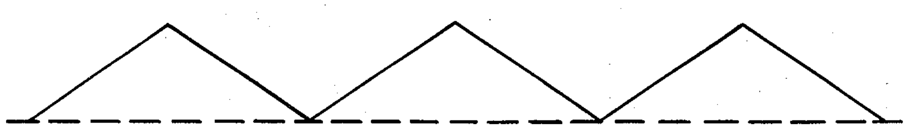
FIG. 13 is a generalized waveform of a varying control voltage.
Figure 14:
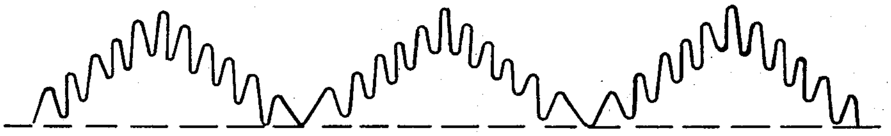
FIG. 14 is a generalized waveform representing the sum of the logged signal shown on a smaller scale and the varying control voltage.
Figure 15:
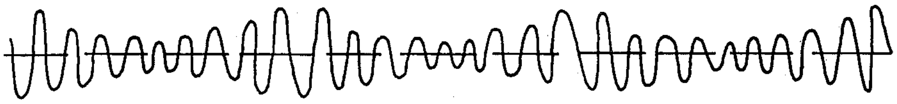
FIG. 15 is a generalized waveform representing the exponentiated sum of the logged signal and varying control voltage, having low frequency components removed.

Referring now to FIG. 11, the action by the level control circuitry upon an audio signal source of given amplitude and frequency is graphically shown. A signal source having sinusoidal waveform with constant frequency and amplitude is represented by FIG. 11. This signal may suitably be a "pure tone" audio signal within the normal hearing range and may be generated by a sine generator or other well-known means. FIG. 12 represents a typical input signal, only converted into logarithmic form. FIG. 13 represents the continuously varying control voltage source having equivalent rise and fall times, the outer envelope of which is regulated by the operator through previously mentioned control means. FIG. 14 represents the sum of the logged signal and the varying voltage source. FIG. 15 represents the final exponentiated output signal having decibel gain qualities inversely and linearly proportional to the rising and falling action of the varying control voltage $V_c$, and having frequency equal to the original signal S. Therefore, as more voltage is applied to the level control circuit, greater positive signal attenuation from a fixed maximum amplitude is realized. This final output signal is shown with low frequency components removed for purposes of illustration. Through the alternate use of noninverting operational amplifiers the above relationship becomes linearly proportional.

As previously noted, the addition of constant voltage $V_k$ serves to provide the input signal S with a fixed polarity, as well as a voltage quantity greater than zero. If a signal source, having fixed polarity and emitting a signal having voltage greater than zero, is provided by signal generator 115, the addition and final deletion of a voltage constant is not required.

Figures 16, 17:
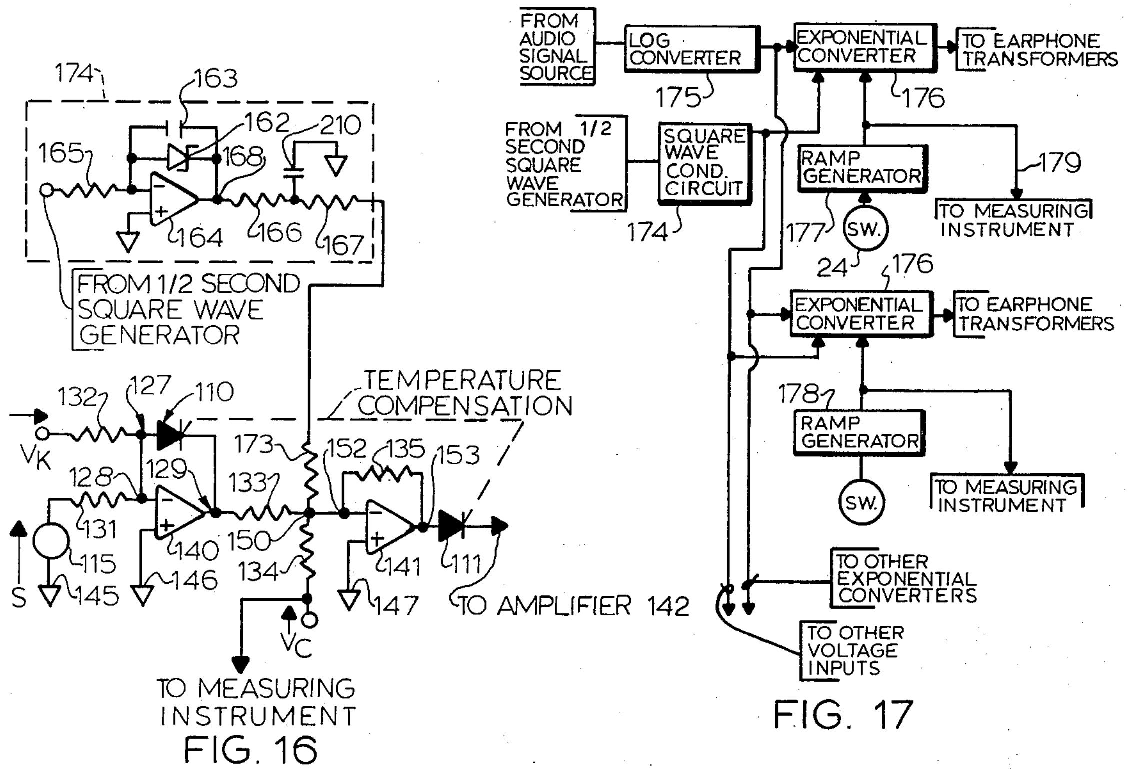
FIG. 16 is a somewhat schematic diagram of a portion of the first form of level control operatively coupled to a tone interrupter circuit.
FIG. 17 is a generalized block diagram of the second form of level control.

As mentioned elsewhere in the description, note should be taken that in current audiological practice when using automatic audiometers to test the hearing of selected examinees, it is frequently desirable to rhythmically interrupt or pulse a test tone to which an examinee is being exposed. It has been experimentally determined that an interrupted or pulsating tone is more clearly intelligible to an examinee when the tone intensity is very close to his threshold, than is a continuous, uninterrupted tone. Tonal interruptions and pulsations are herein synonymously defined as being a regularly occurring series of events whereby each event causes a given audio signal to be momentarily substantially decreased in amplitude. Referring to FIG. 16, the instant level control circuitry, in both embodiments, is readily adapted to accomplish tonal interruptions in a novel manner through the addition of a circuit represented within dashed lines 174, adapted to introduce a modified square wave into the level control circuit, the purpose of which is to cause rapid fluctuations in the control ramp voltage being supplied the level control circuit. The level control circuit is thereby adapted to decrease the amplitude of an audio signal by approximately 40 decibels, for example, corresponding to each tonal pulse or interruption. Thus, an audio tone whose amplitude is as much as 35 decibels above an examinee's threshold of hearing (a level in excess of those even rarely occurring in the hearing test of the class described) will be sufficiently diminished during each tonal interruption or pulse such that the examinee will no longer perceive the tone.

Figure 19:
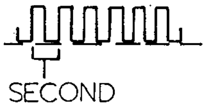
FIG. 19 is a generalized waveform of a square wave having a one-half second period.
Figure 20:
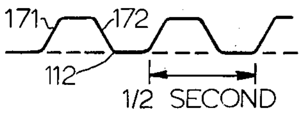
FIG. 20 is a generalized waveform of a modified square wave having a one-half second period.

Tonal interruption is accomplished by passing a square wave represented by FIG. 19, having suitable amplitude and a one-half second period, for example, into a square wave conditioning circuit 174 (see FIG. 16) which is adapted to alter the wave shape so as to reduce the rise and fall times and to round the wave corners 172 somewhat as shown in FIG. 20. This is accomplished by the combined action of a capacitor 163 and Zener diode 162 in shunt configuration around an operational amplifier 164 adapted by appropriate resistors 165, 166, 167 to produce sufficient signal gain while maintaining correct impedance. Capacitor 210 provides further control of the rise of the square wave. When Zener diode 162 is in a forward biased mode of operation during a rising cycle of square wave voltage, capacitor 163 slowly accumulates a small positive charge and a resulting negative voltage appears at junction 168, thereby increasing the instantaneous rise time. Capacitor 210 serves to round the corners of the resulting wave. When, in a downward cycle of square wave voltage, the polarity is reversed, and the Zener diode 162 becomes negatively biased, capacitor 163 will limit the rate of change of the voltage at junction 168 until Zener breakdown occurs, yielding a somewhat increased fall time. The modified square wave voltage is adapted to enter the invention circuitry through a resistor 173 communicating with junction 150 which also receives control ramp voltage $V_c$. Note that resistors 167 and 173 may be combined. It is important to note that a rise or fall time which is too rapid will be characterized by a distinct "click" when the signal is reproduced through earphone transducers. A rise time which is too slow may not reach an adequate level before the downward cycle of square wave voltage begins. A rise time and fall time of 20–50 milliseconds is preferred.

Figure 21:
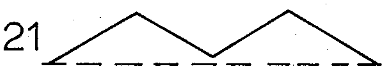
FIG. 21 is a generalized waveform of an ascending-descending ramp voltage.
Figure 22:
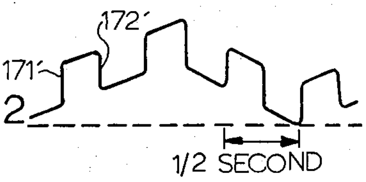
FIG. 22 is a generalized waveform representing the combination of a modified square wave having a one-half second period and an ascending-descending ramp voltage as shown in FIG. 21.

As previously mentioned, due to the signal inverting nature of the described level control circuitry, an increase in control voltage yields a linearly proportional increase in positive signal attenuation, which corresponds to an inverse linearly proportional decrease in signal amplitude. Likewise is the case with tonal interruptions where a rising cycle of modified square wave voltage (see 171, FIG. 20) yields an increase in positive signal attenuation. A falling cycle (see 172, FIG. 20) returns the signal to normal. Reference is made to FIGS. 21 and 22 which respectively illustrate a linear ramp voltage and a combined linear ramp and modified square wave voltage yielding a pulsitile waveform of increasing 171′ and decreasing 172′ voltage pulses superimposed on the ramp voltage, and being adapted to inverse proportionally fluctuate the output audio signal amplitude. In this capacity the level control circuit is readily adapted to produce tonal pulses which are of a highly controlled nature and which effectively prevent production of extraneous "clicks" and the like created by incorrect rise and fall times of the interrupting circuit.

Figure 26:
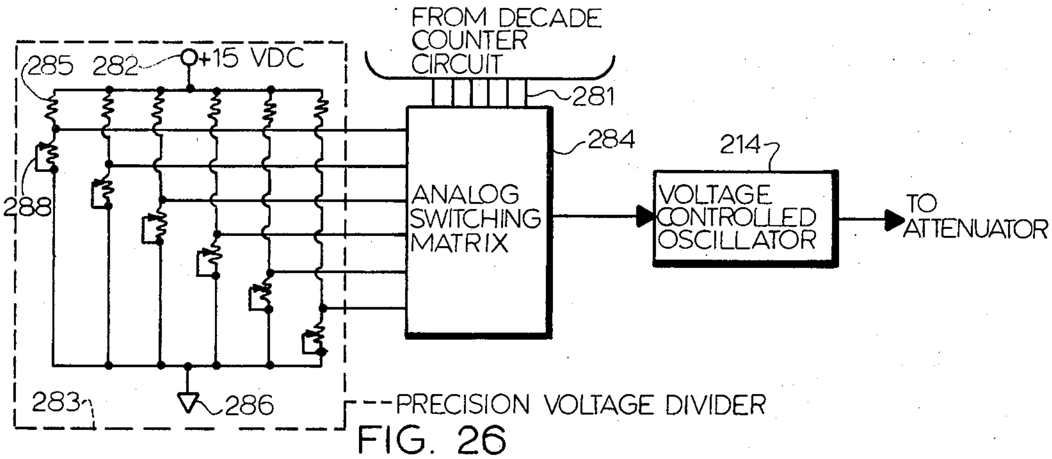
FIG. 26 is a somewhat schematic diagram showing a programmable voltage source employed by the present invention to vary the frequency of audio signals generated by a voltage controlled oscillator.
Figure 37:
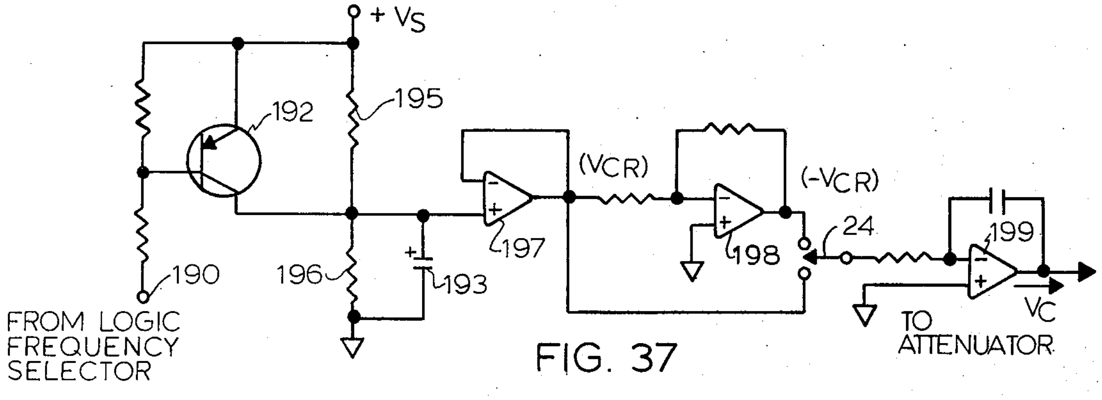
FIG. 37 is a somewhat schematic diagram of a circuit adapted to programmably vary the instantaneous slope of the control voltage from a relatively steep slope to a more gradual slope at a pre-determined rate.

Continuing with the description, referring now to FIG. 17 which illustrates in block form the second and preferred embodiment of the level control circuitry, an audio signal being generated by an appropriate audio oscillator or other signal generating means, see for example, FIG. 26, having been converted to unipolar form enters a logarithmic converter 175 adapted to electrically compute the natural logarithm of that signal. The resultant log converted signal next enters a plurality of exponential converters 176 which are each adapted to also receive a modified square wave voltage from modified square wave conditioning circuit 174 and a ramp voltage from independently controlled ramp voltage generators 177, 178. The number of exponential converters 176 utilized will depend on the number of examinees wished to be tested simultaneously, and may be substantially large (i.e., 8) without necessitating signal boosting amplifiers and the like. Appropriate ramp voltage control means which may be switch 24, as in the case of the first embodiment previously described, is adapted to control the rising or falling slope of the ramp voltage, while an output lead 179 enables measurement of the amount of ramp voltage being supplied each exponential converter 176. In this capacity, a solid state integrator, best shown in FIG. 37, is suited to generate a ramp voltage in the level control circuit. The utilization of solid state circuit means eliminates the use of moving parts while providing the level control circuit with the ability to act in response to programming means as well as manually operating switch means. The resultant audio signal having controlled gain characteristics in inverse proportion to the amount of incoming ramp control voltage and incoming modified square wave voltage may then be transformed by earphone transformers, not shown, prior to entering the various sets of earphones employed.

Figure 18:
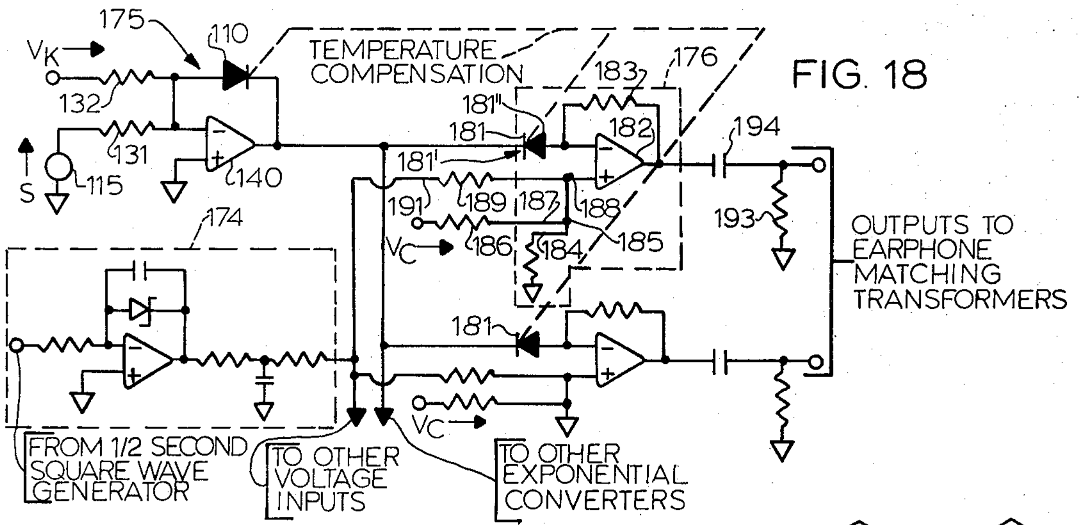
FIG. 18 is a somewhat schematic diagram of the second form of level control circuit and including a circuit adapted to deliver a modified square wave into the level control circuitry.

Referring next to FIG. 18 which schematically illustrates the second and preferred embodiment of the level control circuit, a logarithmic converter circuit 175 identical with that of the first embodiment previously described receives an audio signal from the appropriate signal generator 115 and a constant voltage $V_k$ and includes appropriate current emitting resistors 131, 132, diode 110, and an operational amplifier 140. As previously mentioned, logarithmic converting circuit 175 is adapted to combine the incoming audio signal S with the incoming voltage constant $V_k$ and to compute the electrical log of the combined signal. The resulting signal next enters a plurality of exponential converting circuits, represented in FIG. 18 by dashed lines 176, each including a diode 181 having a cathode end 181' oriented closest to operational amplifier 140, and having an anode end 181'' oriented closest to an operational amplifier 182. A resistor 183 in shunt configuration around amplifier 182 determines the feedback current of amplifier 182. In this embodiment the control voltage $V_c$ and tone pulsing signals are introduced via the positive summing junction of amplifier 182. Communicating with lead 184 at junction 185 is the control ramp voltage $V_C$ which enters the circuit through resistor 186 and lead 187. Communicating with lead 184 at junction 188 is the modified square wave voltage emanating from the square wave conditioning circuit represented by dashed lines 174, which enters the level control circuit via resistor 189 and lead 191. Diode 110 and diodes 181 are suitably temperature compensated by epoxy embedding. The resultant output signal having controlled amplitude qualities passes through resistor 193, and capacitor 194 filter means adapted to remove the pre-viously added direct current components prior to switching, impedance transformation and reproduction by earphone transducers. It should be generally noted that in this embodiment of the invention attenuator circuit, an algebraic increase in the circuit voltage $V_C$ results in tone signal gain as opposed to the first described embodiment shown in FIG. 9 wherein an increase in control voltage instant a decrease in signal gain. change While a linear ramp voltage generator has been used as a basis for understanding and simplifying the broad concept of the invention, it is preferred that a ramp generator having a variable slope capability be used. By this is meant a ramp generator capable of being programmed to provide a steep relatively positive and negative instantaneous slope at the onset of each tone frequency and relatively less and less steep slopes as each tone frequency continues toward its termination. This slope change can be accomplished in an exponential fashion by integrating an exponentially decaying voltage in a manner well-known to the art. This voltage is set to a relatively large initial value at the onset of the tone and decays toward a relatively small final value towards the end of each tone presentation. In accordance with the instant invention it is possible to apply this voltage directly to the ramp generator to obtain the desired change of instantaneous slope in control voltage.

The variable attenuation rate described above enables the test subject to rapidly approach his hearing threshold at the onset of each new tone frequency but to nevertheless approximate his threshold later in the tone presentation.

Referring now to FIG. 37 which generally shows a circuit adapted to effect the above described programmed control voltage slope change. At the onset of a given tone frequency presentation terminal 190 is brought momentarily to ground causing transistor 192 to turn briefly on, which causes capacitor 193 to charge to approximately $V_S$. As indicated in FIG. 37, such initial grounding of terminal 190 may be accomplished by well-known logic means as, for example, in conjunction with a frequency selector in an audiological device. The capacitor voltage $V_{CR}$ then decays exponentially with a time constant $$(R_{195}\, R_{196}\, C_{196})/(R_{195}+R_{196}) \approx [10 \text{ seconds, e.g.}],$$

toward a final voltage equal to $$(V_S\, R_{196})/(R_{195}+R_{196}) \approx [4.5 \text{ volts, e.g.}]$$

Amplifier 197 is connected as a voltage follower and provides impedance buffering for the resistor-capacitor combination $R_{195}$, $R_{196}$, and $C_{193}$. Amplifier 198 is connected as a unity gain inverter. Thus, the voltages at the outputs of amplifiers 197 and 198 are $V_{CR}$ and $-V_{CR}$ respectively. These voltages are applied alternately by means of a switch 24 which is under control of the test subject, to the input of the invention ramp generator embodied herein by integrator 199. The instantaneous rate of accumulation of the integral is now dependent upon the instantaneous value of $V_{CR}$. The algebraic direction of the change in the integral of $V_C$, that is, whether control voltage $V_C$ increases or decreases, is dependent upon the position of switch 24, selected by the test subject. In an automatic audiological application, the output of amplifier 199 can then be used to control the attenuation range of the invention circuit which proportionally controls the sound level applied to a test subject's ear. In this manner, the sound pressure level is caused to vary relatively rapidly early in a given frequency presentation to enable a test subject to rapidly seek his hearing threshold. As the given tone presentation proceeds, the sound pressure level is adapted to vary more slowly with slope decreasing at a predetermined rate permitting the test subject to more accurately maintain the sound pressure level near his threshold. Greater threshold measuring accuracy is achieved while testing proceeds more rapidly and in the total absence of moving and acoustic noise producing relays, cams, and the like.

Figure 2:
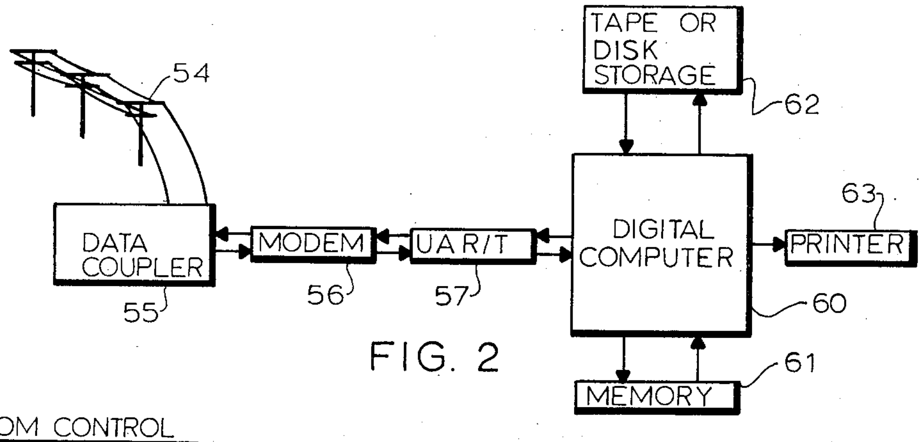
FIG. 2 is a schematic diagram of the portion of the system of the invention which is used at the central data collecting and supervisory station.
Figure 38:
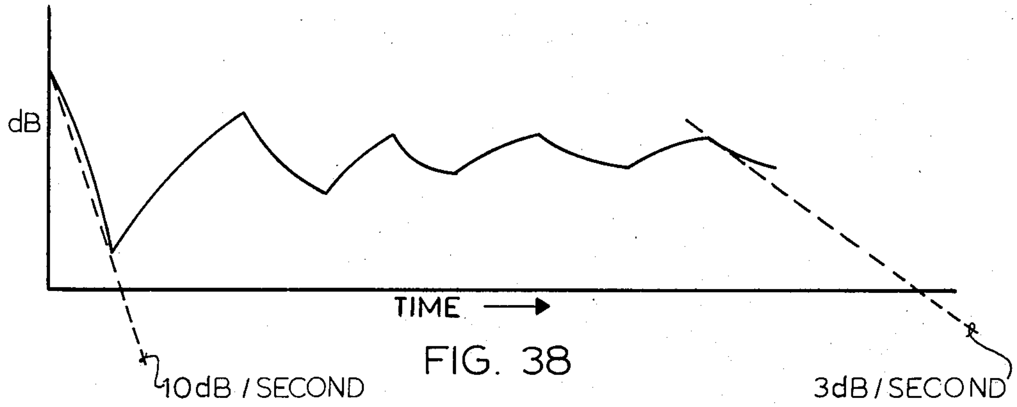
FIG. 38 is a generalized waveform of control voltage obtained during a typical hearing test utilizing the circuit of FIG. 37 in conjunction with the preferred embodiment attenuator circuit.

For a better understanding, the above described controlled slope ramp generation as seen in FIG. 38 may be compared with FIG. 2 of U. S. Pat. No. 3,673,328. In FIG. 2 of the patent, the attenuation slope changes abruptly upon operation of the subject hand switch whereas the smooth slope change shown in FIG. 38 of from 10 dB/sec to 3 dB/sec obtained by the above described invention circuit has been found to be less confusing to the subject and in addition may be accomplished herein by fully solid state circuit means.

The term "ramp generator" described in connection with the control voltage should be understood in the light of the above description as including both strictly linear ramp generators as well as ramp generators capable of generating non-linear and controlled slope ramps.

From the foregoing, it can be concluded that the level control circuitry provides an extremely accurate means to programmably control the amplitude level of a given audio signal while maintaining the precise frequency, impedance, and linearity of that signal, and is thereby highly suited for use in precision automatic audiological apparatus. Furthermore, it is now possible to govern the amplitude level of a given audio signal through the addition of a voltage supply which can be varied continuously, and which is linearly proportional to the final output sound pressure level (dB) of that signal, providing a convenient means to directly measure output sound pressure level. In addition, the level control is readily adapted to produce a regularly interrupted signal through a novel circuit means. The described level control circuitry has the even further advantage of providing an accurate programmable audio level control circuit which has no moving component parts to wear, and which is consequently virtually devoid of system generated acoustic noise and distortion.

All of these various advantages to be found in such a level control circuit will, of course, be appreciated as being of very special significance when applied to the system and method of the present invention. A particular advantage of the described level control that will be recognized by those skilled in the art resides in the programming capability. For example, the tone generator or audible frequency source may be in solid state form and programmed to produce a particular set of frequencies in a particular sequence. Such a program thus allows the patient to control only the ramp wave generator. For calibration, instead of using the patient to control the control voltage, i.e., the ramp wave generator, the program itself may be employed for this purpose through use of solid state logic circuitry as set forth elsewhere in the description. Thus, a defined rise and fall voltage pattern can be programmed for the ramp wave generator and thereby produces a defined decibel pattern for earphone calibration purposes. When one considers the difficulty of attempting to program motors, stepping switches, slide wire rheostats and the like as encountered in many conventional audiometers the overwhelming advantage of such a programmable voltage level control to the present audiometric system and method invention becomes apparent.

DESCRIPTION OF THE CONTROL LOGIC CIRCUIT

Having described the level control circuit as one of the significant components of the system and method of the present invention, the description next turns to a detailed description of the logic circuitry employed in the system of the present invention.

Continuing with the description, the control logic circuit utilizes design concepts considered well-known in the art of digital logic circuitry, and is constructed almost exclusively using TTL (transistor-transistor logic) components of the 7400 series, available for example from Fairchild Semiconductor, San Rafael, California. In the case of analog switching components requiring higher operating voltage levels than are available from TTL circuitry, integrated circuits of the CD 4000 series, available from RCA Corporation, Harrison, New Jersey, are employed. In addition, discrete bipolar, MOS, and FET transistors are utilized for analog switching, digital level shifting, and interfacing. By means of appropriate interfacing between a digital computer, a digital input-output port is created which makes it possible for the automatic audiometer portion of the system of the invention to communicate bidirectionally with the computer 60. This is accomplished by the use of an 8-bit binary instruction system. Thus, information emanating from the audiometer is received as 8-bit data by computer 60. Correspondingly, commands from computer 60 are received by the control logic circuit, FIG. 23, identified broadly by the numeral 12, as 8-bit data instructions.

Figure 23:
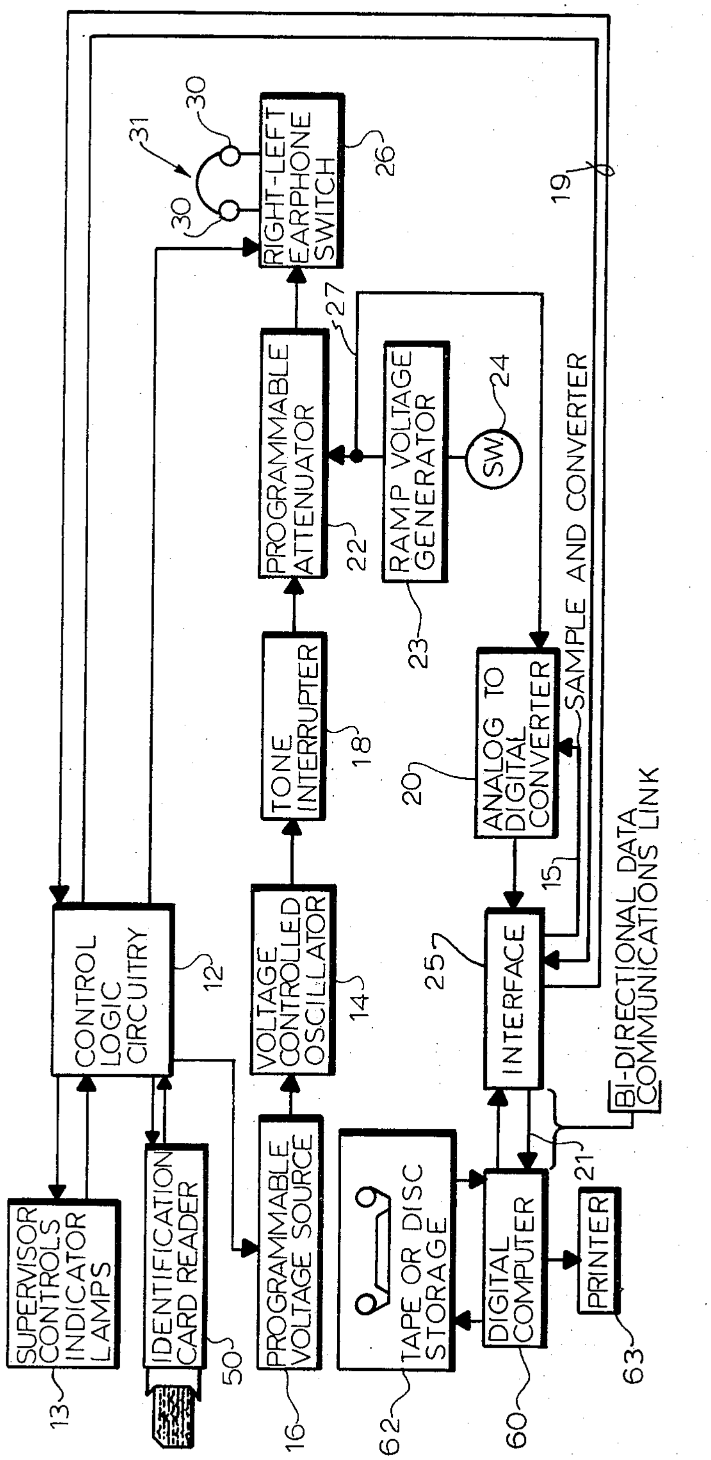
FIG. 23 is a generalized block diagram of the system of the invention utilizing a local computer.
Figure 24:
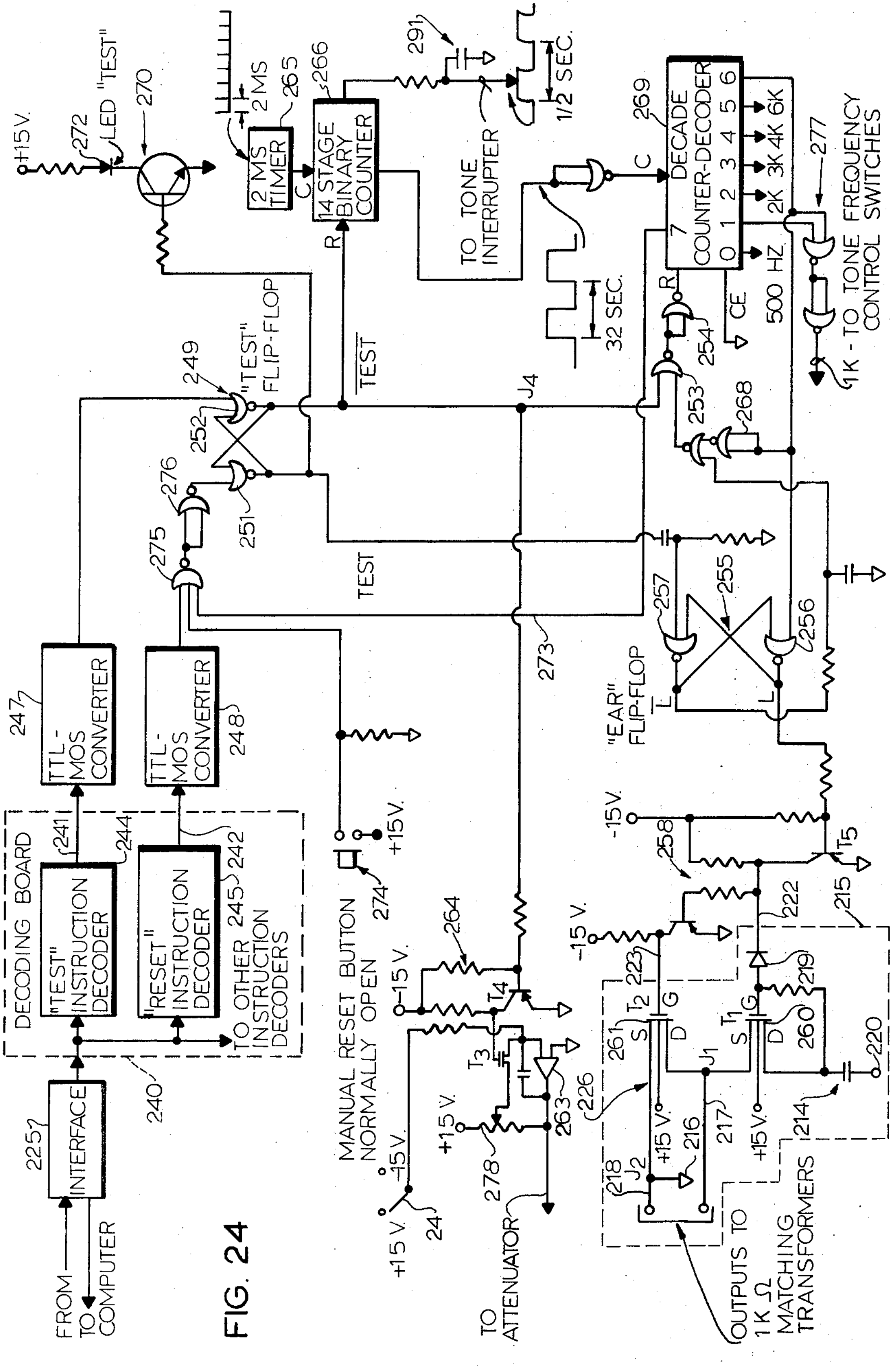
FIG. 24 is a somewhat schematic diagram of a control logic circuit used in the system of the invention.
Figure 25:
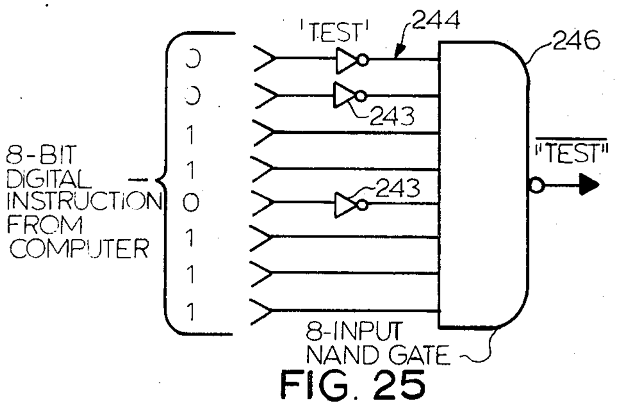
FIG. 25 shows a digital instruction decoding circuit used in the system of the invention.
Figures 27, 28:
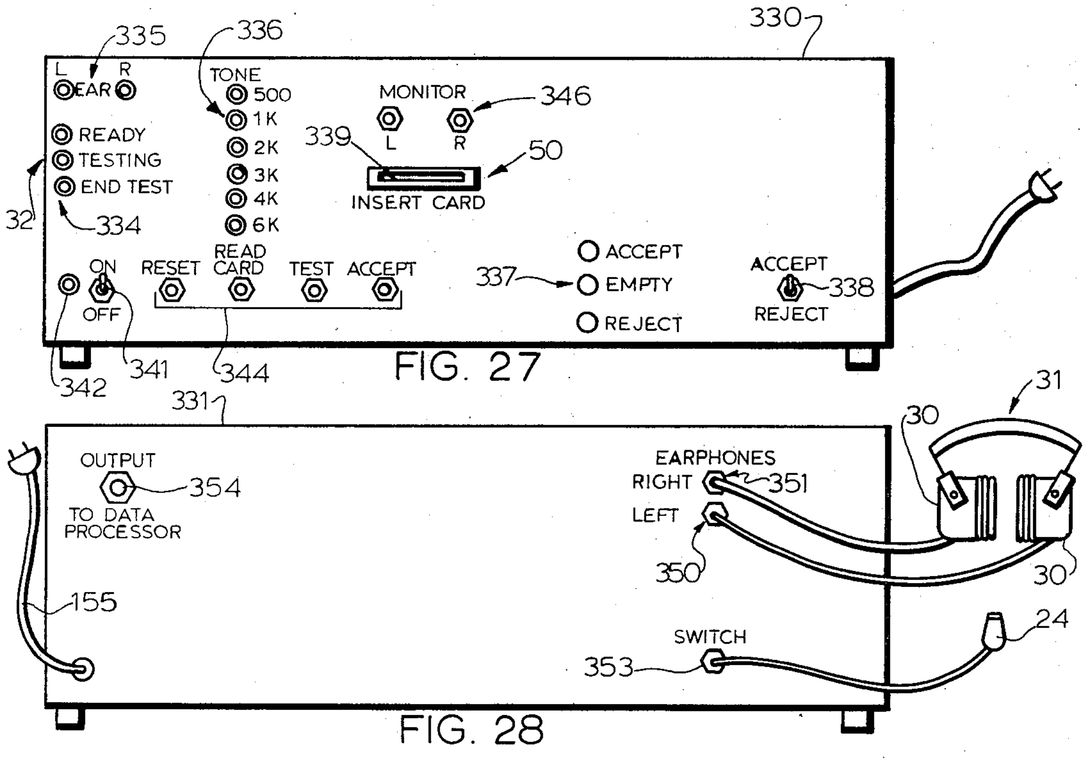
FIG. 27 is a front elevation of an electronics housing employed by the second embodiment of the invention showing supervisor controls for a single test station.
FIG. 28 is a rear elevation of an electronics housing employed by the second embodiment of the invention, showing earphone and control switch jacks for a single test station.

During the course of the following description it should be borne in mind that FIGS. 1–7 and FIGS. 29, 30 and 31 broadly relate to use of the logic circuitry 12 in a computer controlled system having telephone line linked plural test locations that are geographically widespread whereas FIGS. 23, 27 and 28 are intended to illustrate use of the logic circuitry 12 in a computer controlled system having a single test location and direct link not necessarily requiring use of telephone or comparable communication. As previously mentioned, the invention embodiment employing a local, direct computer link is equally suited for testing plural numbers. The logic circuitry is illustrated in FIGS. 24, 25 and 26. Referring to FIG. 24, instructions from computer 60 pass through an appropriate interface 225 which is connected directly to an instruction decoding board 240, which is adapted to decode the digital instruction and simultaneously cause a corresponding digital output line 241 to achieve a high state or logic level of 1 to initiate a specified operation. Computer 60 may be any conventional digital computer having sufficient input/output and computation abilities to satisfy the needs of this invention, or a special purpose digital computer fabricated solely for the needs of this invention and which may be extremely small in physical size. The various digital lines 241, 242 carrying signals from decoding board 240 may each perform one or more functions: to begin a process such as the testing sequence; to illuminate an appropriate panel lamp; to terminate a process. A process is typically initiated by setting a flip-flop, and is terminated by resetting the flip-flop. Likewise, various panel lamps are illuminated by "latching" the various transistors which drive them.

While the logic circuitry being described is believed to be constructed within the skill of the art, a better understanding may be had by describing in detail a portion of the logic circuit which is adapted to control, for example, the sequence of test frequencies presented during the administration of a hearing test.

Referring now to FIG. 25, preparatory to initiating testing, a supervisor will have requested computer 60 (FIG. 2) to start the test sequence as soon as it is ready to receive test data. A discrete digital confirmation instruction thus given by computer 60 to start the test sequence may comprise, for example, the 8-bit binary number 00110111, which enters "TEST" decoding circuit 244. A "TEST" decoding circuit 244 comprises, for example, three inverter components 243 each being adapted to invert its respective bit logic level from 0 to 1, and an 8-input NAND gate 246 adapted to emit a level 0 signal when eight 1 level digital inputs are present. Referring again to FIG. 24, the resultant "TEST" or level 0 signal next enters a TTL-MOS converter circuit 247 adapted to invert and increase the signal voltage in order to drive the various MOS components later utilized in the circuit. The resultant inverted level 1 signal now enters a flip-flop 249 comprising cross-connected NOR gates and designated "TEST" in a level 1 state setting the flip-flop and consequently causing NOR gate 251 to output a level 1 signal. The resultant signal next enters a flip-flop 255 designated "EAR" in a level 1 state causing NOR gate 256 to emit a level 1 signal through a positive to negative voltage converter circuit 258 to a left series earphone transistor switch 260, thereby causing the left earphone being employed to be connected with the audio signal source (not shown) through series transistor 260. At the same time the left earphone is effectively ungrounded as shunt transistor 261 is caused to open circuit by a voltage of zero volts applied to its gate due to the logic level of 1 emanating from NOR gate 256. Simultaneously the right earphone series switch (not shown) is caused to turn off and the right earphone shunt switch (not shown) is turned on. This enables the logic circuitry to prevent signal cross talk between earphones due to induction, etc., since any unwanted extraneous signals passing into the inactive earphone are brought immediately to ground.

Initiating the "test" procedure also has the effect of beginning the sequential stepping between different stages of a decade counter 269 which includes a decoding mechanism, each stage corresponding to a separate predetermined voltage controlled frequency. A digital timer 265 delivers a pulse train at the rate of one pulse every 2 milliseconds into a binary counter 266 which is adapted to emit a square wave pulse at .5 second intervals to tone interrupter 18 (shown in FIG. 1) and which emits a square wave pulse every 32 seconds (i.e., $2 \times 2^{14}$ milliseconds) into decade counter 269. When a "TEST" instruction is present, NOR gate 252 of "TEST" flip-flop 249 (shown in dashed lines) outputs a level 0 signal through NOR gate 253, then through NOT gate 254 and into decade counter 269 causing it to being stepping from a first through subsequent steps corresponding to the various frequencies indicated. In addition, the output level 0 state causes binary counter 266 to begin counting the above mentioned 32 second square wave interval. Finally, the level 1 state existing at NOR gate 251 causes transistor circuit 270 to be energized (to "latch") thereby illuminating a light-emitting-diode 272 designated TESTING on the invention apparatus control panel. See lamp 32 in FIGS. 27 and 30.

Next will be described the "RESET" procedure which resets the binary counter 266 controlling the tone interrupter, as well as the decade counter 269 controlling the sequential stepping of test frequencies. Preparatory to the administration of a hearing test, a "RESET" instruction comprising an 8-bit binary number different from that used to begin a "TEST" sequence, is received from computer 60 by a "RESET" instruction decoder 245, which acts to generate a level 0 signal from a NAND gate (not shown), and which is directed through a TTL-MOS converter circuit 248 adapted to invert and increase the logic level to an acceptable voltage for later use by MOS components. The resulting level 1 signal now enters NOR gate 275 and is output in a level 0 state. The signal now enters NOT gate 276 and is output in a level 1 state before entering "TEST" clip-flop 249. The resultant level 1 signal, which is the input into NOR gate 251, causes the opposite NOR gate 252 to output a level 1 signal into binary counter 266, causing it to become initialized. In addition, the above level 1 signal being input into NOR gate 253 is output as level 0 into NOT gate 254, and is output as level 1 and is fed into decade counter 269, causing it also to be initialized.

A "RESET" instruction may be remotely initiated from the computer at any time to any remote test site. As elsewhere indicated, the same instruction may be manually initiated at any test site by reset button 274, FIG. 24. The described invention circuitry also lends itself in appropriate circumstances to the "RESET" instruction being sent simultaneously to a plurality of geographically widespread test sites, or selectively to a particular test site. This may be done through the use of conventional computer switching circuitry, not shown, well-known to those skilled in the art. In addition to the foregoing, a "RESET" instruction is also adapted to cause the programmable attenuator 22 (see FIGS. 1 and 23) to maintain a level corresponding to 30 dB HTL (hearing threshold level) prior to the commencement of a test sequence as illustrated in FIGS. 32 and 33. This is accomplished as a logic level of 1 emanating from NOR gate 252 as a "RESET" or "TEST" instruction enters a transistor switching circuit 264 (shown in dashed lines) adapted to energize transistor $T_4$ via junction $J_4$ when a level 1 signal is present, thereby causing a ramp-generating integrator 263 to be held at a voltage level corresponding to 30dB HTL. Note that integrator 263 which is mentioned here in connection with an explanation of FIG. 24 corresponds to the ramp generator 23 in FIG. 1 and FIG. 23, to the variable control voltage 126 in FIG. 8 and to the ramp generators 177, 178 in FIG. 17 and to integrator 199 in FIG. 37. This voltage level may be adjusted by trimming potentiometer 278. The mentioned operational amplifier 263 adapted for integrating purposes is thus utilized as the ramp voltage generator adapted to supply ramp control voltage to programmable attenuator 22, shown in FIGS. 1 and 23. The 30 dB HTL corresponding voltage level is maintained as long as a logic level 1 signal is present as in the case of a "RESET" instruction. When in the case of a "TEST" instruction, a level 0 signal is present, transistor switching circuit 264 is adapted to turn on thereby transferring control of integrator 263 to examinee operated switch 24 (see FIG. 1 and FIG. 24).

During the test sequence, six stages of decade counter 269 corresponding to the six test frequencies of 500, 1000, 2000, 3000, 4000, and 6000 Hertz are sequentially energized for 32 seconds each. When the seventh sequential step is reached, a level 1 signal emanates from decade counter 269 output '6', resetting "ear" flip-flop 255 to the right ear position while simultaneously grounding the left earphone, and opening the left earphone series switch. At this time, a level 1 signal passes through feedback loop 268 into decade counter 269 which resets and starts the test sequence for testing the right ear. Once the seventh step has again been reached, the number '1' position frequency of 1,000 Hertz is repeated in the right ear as a comparison measure to check those persons attempting to falsify the results. A NOR-NOT gate combination 277 is provided for this additional step. Following the additional frequency step, a feedback line 273 communicating between decade counter 269 and NOR gate 275 assumes a level 1 state thereby automatically initiating a complete "RESET" procedure. Note that provision is also made for a supervisor to mmanually terminate and reset the test sequence through the use of a normally open manually operable switch 274.

Other parameters of the control logic circuit 12 (FIG. 1) include the illumination of various additional panel lamps, logic means adapted to receive digital signals from card reader 50 (see FIGS. 1 and 23), manually operable switching means adapted to energize the circuitry, initiate a "RESET" procedure, initiate a TEST procedure, cause a tabulating card to be read, cause data to be received by computer 60 and cause a set of test scores to be invalidated. These parameters are viewed as being consistent with the logic circuitry which has been previously described and are deemed well within the stated art requiring no further elaboration herein.

Continuing with the description, referring now to FIG. 26, the programmable voltage source 16, shown in FIGS. 1 and 23, is adapted to produce different selected precise voltages in response to pre-programmed logic instructions emanating from decade counter 269 (see FIG. 24) through appropriate input terminals 281 and utilizes an appropriate voltage supply 282, and a precision voltage divider circuit represented by dashed lines 283, in conjunction with a 6-input analog switching matrix 284 to obtain different precise voltages. A precision voltage divider 283 comprises a plurality of resistive elements 285 having adjustable different resistive values connected in series between voltage supply 282 which may be 15 volts D.C., and an appropriate ground 286. So-called trimming potentiometers 288 may be utilized to precisely set the different voltages, such that the voltage controlled oscillator 14, shown in FIGS. 1 and 23, generates the desired corresponding frequencies. The use of trimming potentiometers also facilitates easy frequency calibration of the system apparatus during normal use. During a normal test sequence appropriate signals sequentially emanating from the various positions of decade counter 269 (see FIG. 24) cause switching matrix 284 to sequentially emit a first, then subsequent voltages, into voltage controlled oscillator 14 for a period of 32 seconds each, thereby causing to be generated a series of test tones having different corresponding frequencies occurring in pre-programmed sequence as further illustrated in FIG. 36.

As mentioned above, the different voltages produced in programmable voltage source 16 are fed into voltage controlled oscillator 14 and are used to generate the corresponding different frequencies $F_1$, $F_2$, $F_3$ and $F_4$ (FIG. 34). A suitable voltage controlled oscillator for purposes of oscillator 14 is available from Wavetek, San Diego, California, as Model NOS. 120-021 and 120-022 combined. Alternately, a plurality of pure tone audio oscillators having different selected frequencies and a suitable programmable tone switching matrix may be used to programmably generate the various different audio frequencies presented during a hearing test.

Referring again to FIGS. 1 and 23, the resultant signal pulses now enter programmable attenuator 22 which comprises the level control circuitry which has been separately described in connection with FIGS. 8 through 22. Referring to FIG. 32 which graphically represents percent control voltage of an individual attenuator with respect to time, as previously mentioned, the control voltage is maintained at a level 95 corresponding to 30 dB HTL prior to the beginning 96 of the hearing test sequence. Once the test sequence is begun, and a first frequence is being produced, the attenuator is automatically released to begin raising the audio signal intensity and, as previously mentioned, control of the intensity is then transferred to an examinee operated switch 24. Switch 24 is shown in FIGS. 1, 10, 17, 23, 24, 28 and 31. Mention is made here that switch 24 should preferably be comfortable for the examinee to grip, easy to press, and acoustically silent in operation. A switch characterized by a "click" during operation would not be suitable. Alternately, a foot operated switch having silent operating characteristics may be utilized for persons having impaired finger movements.

The initial change in control voltage $V_c$ being fed to this attenuator is represented by curve 97. As soon as the examinee hears the tonal pulsations and presses the control switch, at point 98, the control voltage curve begins an ascending cycle, indicated by line 99. Likewise, when the tonal pulsations fade from audibility and an examinee appropriately releases his respective switch 24, represented by point 100, the control voltage $V_c$ will begin a descending cycle again. In the context of FIGS. 32 and 33 the very brief tone interruptions are not shown.

Referring now to FIG. 33, which represents the actual tonal pulsation sound pressure level in dB to which an examinee is exposed consistent with the wave pattern of $V_c$ in FIG. 34, it is of importance to note that the sound intensity wave envelope outer edge, represented by dashed line 103, inversely approximates the waveform of the control voltage shown in FIG. 34. That is, the control voltage $V_c$ being governed by an examinee, inversely and proportionally determines the sound intensity level in decibels to which the examinee is being exposed. Although it is recognized that during a tonal interruption the signal amplitude will diminish appreciably, FIG. 33 is more importantly concerned with the outer envelope of sound intensity to which an examinee is exposed.

FIG. 34 represents the sound intensity envelope measured in dB over a portion of a typical test sequence, and shows X' of FIG. 33 to relative scale. $F_1$, $F_2$, $F_3$ and $F_4$ represent different successive test frequencies of the pre-programmed automatic test sequence, each of which is held for a duration of 32 seconds. For purpose of illustration, FIG. 35 shows the result of a complete typical hearing test, a portion of which is consistent with X' in FIG. 33, conducted on an automatic audiometer according to the invention, only coupled to an X-Y chart type recording apparatus yielding a prior art audiogram 109. The distance X', as indicated, is in proportion and is generally consistent with FIGS. 33 and 34. FIG. 36 shows, for comparison purposes, how in the present invention the same test results are directly printed in numerical form on an appropriate printout sheet, from the same data provided for the tracing of the FIG. 35 audiogram. It should be noted that in the past an audiologist would normally be required to further arrive at numerical results on the basis of the prior art audiogram 109 curve by visually approximating the mean of each respective frequency curve, the chance for error is great. With the present invention, however, data is sent directly to a computer which is adapted to produce numerical printed results, thereby effectively circumventing the prior art approximation techniques.

Referring again to FIG. 1, for the telephone linked computer system and to FIG. 23 for the locally linked computer system, tonal pulses now emanating from analog programmable attenuator 22, having controlled amplitude and frequency characteristics next center right/left earphone switch 26. Switch 26 is best illustrated within dashed lines 215 in FIG. 24, which shows only the left earphone switch for purposes of simplification. Referring further to the logic circuitry of FIG. 24, the left earphone switch comprises a pair of MOS-FET switching transistors $T_1$ and $T_2$ (for example, Hughes model HDGP1001) each having a substrate connected to a 15 volt power supply, and both being connected in series through high-pass filter means 214 with attenuator output 220 and being further connected in series with a suitable ground 216. The drain (D) terminal of transistor $T_1$ is connected through resistor-capacitor filter means 214 to attenuator output 220. The source terminal (S) of transistor $T_1$ is connected to the drain terminal (D) of transistor $T_2$. A lead 217 communicates between a 1000 ohm left earphone matching transformer (not shown) and junction $J_1$. The source terminal (S) of transistor $T_2$ communicates to ground 216. A suitable ground 216 is located at junction $J_2$. A first digital line 222 which emanates from the control logic circuit communicates via diode 219 with the gate (G) of transistor $T_1$ and carries appropriate signals adapted to activate transistor $T_1$, and which is adapted in one mode of operation to enable test signals to flow into a left earphone transducer (not shown). A second digital line 223 is approximately connected to the gate (G) of transistor $T_2$ and is adapted to carry signals alternate to that of digital line 222, and which is adapted in the other mode of operation to enable stray test signals in the left earphone circuit to flow into ground when the right earphone transducer (not shown) is activated.

It is important to note that the operating characteristics of $T_1$ and $T_2$ are such that a negative digital signal which may be characterized as level 1 energizing the gate (G) will cause electrical conduction between the source (S) and drain (D). On the other hand when a voltage of zero is present at the gate, electrical conduction between source and drain is effectively prevented. Due to the action of "EAR" flip-flop 255 of alternating opposite digital levels in output lines L and $\bar{L}$, whenever an audio test signal is adapted to be produced in one earphone, the opposite earphone is effectively prevented from conducting a signal. In addition, the output matching transformer (not shown) opposite the one transforming audio test signals will always be grounded due to the transistor source connection with ground 216, thereby preventing induction. Thus, signal cross talk between earphones is effectively prevented in the present invention embodiment.

CONTINUING GENERAL CIRCUIT DESCRIPTION APPLICABLE TO BOTH EMBODIMENTS BUT USING SECOND EMBODIMENT DESIGNED FOR LOCAL TEST LOCATION AS BASIS FOR DESCRIPTION

As elsewhere mentioned, earphones 30 used in both embodiments preferably include circumaural noise cancelling earcups having calibrated earphone transducer inserts. The utilization of noise excluding, yet calibrated, earphones provides the computer controlled hearing system of the invention with the advantage of being able to conduct a hearing test without the use of specially fabricated soundproof booths, when the ambient noise environment will permit, while at the same time maintaining accurate calibration between the earphones and the audiometer portion of the circuitry.

According to the present invention, previously mentioned ramp generator 23 which may suitably be an integrating operational amplifier (see 263, FIG. 24) is adapted to generate an ascending-descending ramp voltage of predetermined variable slope as an input into programmable attenuator 22. In order to enable measurement of the amounts of ramp voltage being applied the programmable attenuator 22 line 27 (FIG. 23) is adapted to communicate between the output of ramp voltage generator 23 and an analog to digital converter 20. In FIG. 1 the output line 33 is shown connected to multiplexer 42 and then to the analog to digital converter 47 whereas in FIG. 23 a comparable connection to an analog to digital converter 20 is made through output lead 27. An analog to digital converter suited to the invention circuitry is manufactured by Zeltex, Inc., of Concorde, California, as Type FD 460 8-bit A/D Converter. Using the direct linked embodiment illustrated by FIG. 23 as a basis for the present description, it will be noted that lead 15 in FIG. 23 communicates between interface 25 and analog to digital converter 20 and carries a sync pulse from interface 25 which is adapted to cause analog to digital converter 20 to sample the instantaneous ramp voltage and to simultaneously convert this voltage to a digital format acceptable to digital computer 60. This sampling and converting procedure is preferably repeated two times per second, or more, if desired.

Continuing to use the FIG. 23 embodiment as a basis, digitally converted signal pulses representing the analog ramp voltage samples next enter interface 25 prior to entry into digital computer 60. A suitable computer interface is largely determined by the type of computer being utilized. A PDP-8 Data Processor manufactured by Digital Equipment Corporation of Maynard, Massachusetts, has been utilized. A compatible interface is the type BBO-8 interface also manufactured by Digital Equipment Corporation. As previously mentioned, interface 25 is adapted to initiate a sample and convert procedure in A/D converter 20 by emitting a sync pulse. In addition, interface 25 is addressable to specific digital characters and serves as an input-output instruction linkage between computer 60 and control logic circuitry 12 via appropriate leads 19, and a bidirectional data communications link 21.

Digital computer 60 may suitably comprise virtually any digital computer having memory and programmable features which can be connected to a suitable disk or tape storage unit 62, and which can also be adapted for printing of computer results through an appropriate printer 63. A tape storage unit suited to be employed with previously mentioned PDP-8 digital computer, is Magnetic Tape Controller Model TC58 linked with Magnetic Tape Drive Model TV20A, aslo manufactured by Digital Equipment Corporation of Maynard, Massachusetts. A suitable printer is manufactured by the Teletype Corporation of Skokie, Illinois, and is the well-known ASR-33 "teletype."

Figure 30:
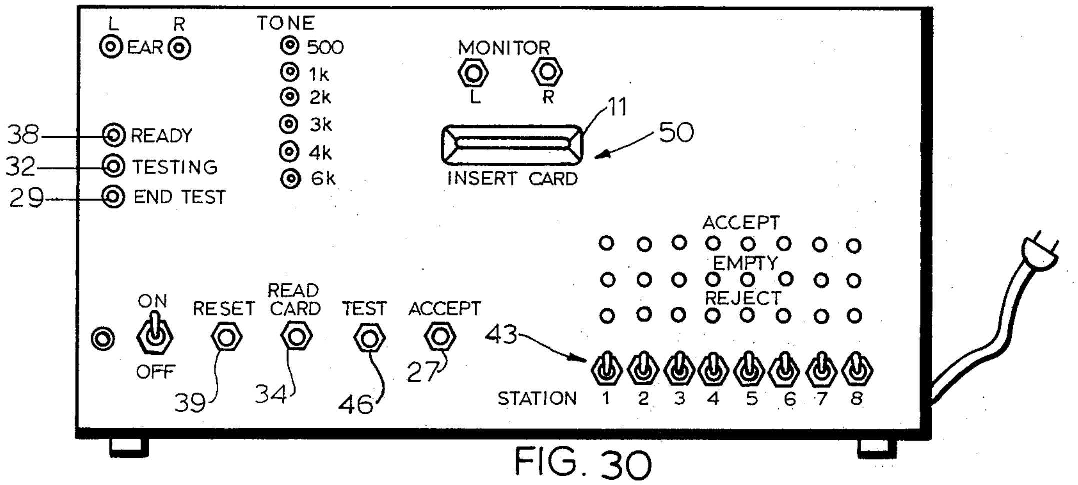
FIG. 30 is a front elevation of an electronics housing employed by the first embodiment of the invention showing supervisor controls for plural test stations.
Figure 31:
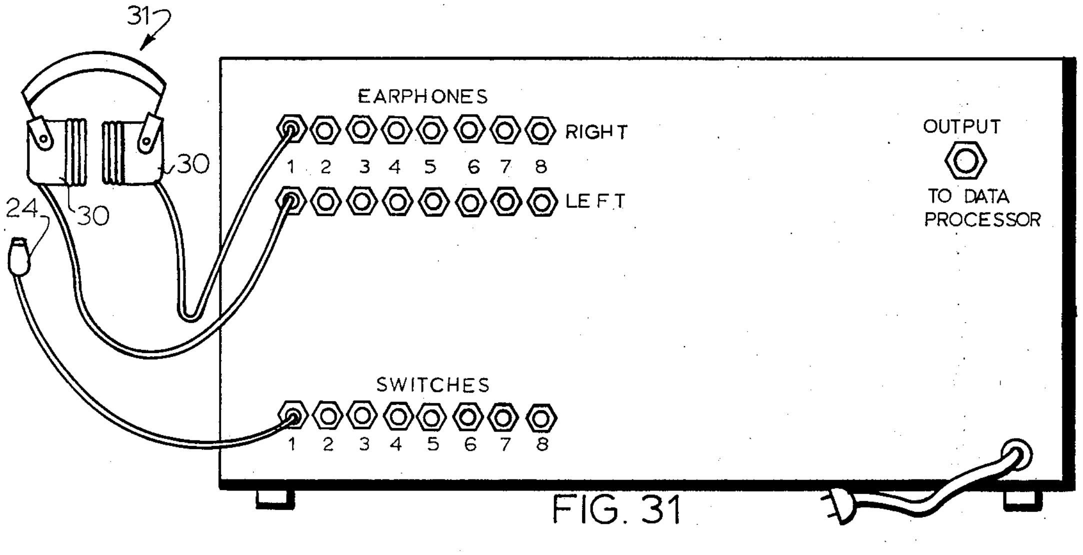
FIG. 31 is a rear elevation of an electronics housing employed by the second embodiment of the invention showing earphone and control switch jacks for plural test stations.

In both embodiments of the invention, that is, the telephone line linked computer controlled audiometer system of FIG. 1 and the locally direct linked computer controlled system of FIG. 23, it is contemplated that the apparatus will be housed in portable housings. In this regard, appropriate housings for the more complex FIG. 1 system are illustrated in FIGS. 30 and 31 to which reference is made elsewhere. FIGS. 27 and 28 illustrate comparable views of housing for the FIG. 23 type system.

For the FIG. 23 type system, there is employed a lightweight portable housing which includes a front panel 330, best shown in FIG. 27, and a back panel 331, best shown in FIG. 28. Referring specifically to FIG. 27, indicator lamps 334, 335, 336, 337 are provided enabling a supervisor to visually monitor the progress of a hearing test and to note any malfunctions. Light emitting diodes are preferably utilized as indicator lamps due to their low power requirements and their compatability with digital logic circuitry and longevity. Right and left earphone lamps 335 as well as tone frequency lamps 336 indicate the actual status of the pre-programmed frequency-stepping test sequence. Furthermore, lamps 334, generally designated "READY," "TESTING," and "END TEST" indicate the status of the computer, at the respective stages of the hearing test. Inductor lamps 337 visually inform a supervisor whether at the end of a hearing test the computer has accepted the various data or has rejected it as being inaccurate or inconsistent beyond predetermined bounds. If no responses are made into an examinee operated attenuator control switch, indicator lamp designated "EMPTY" will be illuminated by the computer indicating that no responses have been made. Through the use of switch 338 a supervisor can manually invalidate an individual test score if, for example, the examinee appears confused, drops his switch, etc. A suitable aperture 339 is further provided on panel 330 for inserting into card reading device 50, various data processing cards bearing the name and other pertinent information of the examinee being tested. A power switch 341 and appropriate indicator light 342 and a plurality of push button switches 344 enable a supervisor to energize the invention circuitry, reset the test sequence prior to testing: "RESET"; cause a tabulating card entered into card aperture 339 to be read: "READ CARD"; to initiate automatic testing: "TEST"; and to cause the computer to initiate computation of the test data at the termination of the hearing test: "ACCEPT". Finally, a pair of earphone jacks 346 enable the supervisor to audibly monitor through suitable earphones (not shown) the sequence of test frequencies being presented to the examinee.

A card reading device 50 suitable for both embodiments (i.e., FIG. 1 and FIG. 23) and which is adapted to be located behind aperture 339 in FIG. 27 is manufactured by Matsushita Electric Company of Tokyo, Japan, as Model ZU-264-HR-3H, and is adapted to photoelectrically read a punched tabulating card and to emit appropriate data signals corresponding to punched holes in said card via control logical circuit 12 to computer 60.

Referring now to FIG. 28 which shows the invention housing back panel 331, left 350 and right 351 earphone jacks are provided for connecting left and right earphones 30. In addition, a switch jack 353 is adapted to permit connection of an appropriate two pole examinee switch 24. A multi-terminal connector 354 serves as an input/output for direct patching to a digital computer. Finally, a power supply cord 355 connects the circuitry with an appropriate power supply.

CONTINUING GENERAL DESCRIPTION OF SYSTEM AND METHOD APPLICABLE TO BOTH EMBODIMENTS BUT USING FIRST EMBODIMENT AS BASIS FOR DESCRIPTION

While the foregoing has been described in connection with both individual and plural automatic audiological screening devices, it is a recognized object of the present invention to provide means to simultaneously test a plural number of individuals at each of a plurality of test centers. Referring again to FIG. 1, a second, third, and fourth series of programmable attenuating devices, related integrators and control switches, earphone switches, and earphone sets functionally arranged, as previously described, are connected in parallel with the above cited programmable attenuator 22. Each functional grouping of attenuator, integrator, user operable switch, and earphone switch may be considered a separate earphone control unit as indicated by dashed lines 45. In accordance with the invention, each separate pair of earphones used is accompanied by a separate earphone control unit 45. In this connection, the invention contemplates the use of printed circuit cards or integrated circuit means embodying an earphone control unit as shown, and which can be easily added into the audiological screening device represented by dashed lines 10 to accommodate varying numbers of individuals to be simultaneously tested. For example, during an initial large scale screening test of a given industrial concern, one or more earphone control units may be employed to speed the testing. Once the large scale testing is completed and only occasional testing is required for new employees, for example, all but one of the earphone control units 45 may be removed, leaving an individual screening audiometer 10 to maintain an ongoing, less extensive test.

Continuing with the description in reference to FIG. 1, in the preferred form of the invention, data signals representing the output sound pressure level produced in each earphone 30 are fed from each earphone control portion 45 through signal output 33 into a signal conditioning circuit 40 including a multiplexer 42 adapted to sequentially monitor, on a rapid time-sharing basis, each of the output signals emanating from earphone control units 45, an analog to digital converter 47 adapted to translate the multiplexed data signals into digital format. Also included is a digital U.A.R/T (universal asynchronous receiver-transmitter) 49 adapted to serialize each train of data, that is, each sequence of one electrical measurement quantity of information from each of the earphone control units 45, so as to include a start bit, 8 representative data bits, a parity bit for measurement of data transmission accuracy, and appropriate stop bits making up one complete set or train of data.

A card reader 50 is adapted, upon the insertion of a suitable card bearing, for example, the name of an examinee, his age, social security number, etc., to identify his respective test results from others being simultaneously given.

The digitized and serially encoded information signals now enter a modem 52 (modulator/demodulator) adapted to modulate the data signals together with a voltage carrier, thereby enabling transmission of test data through conventional telephone lines 54 via appropriate data coupling means 53. In the preferred form of the invention, data coupling means 53 may comprise a 1000-A coupler manufactured by Western Electric employed with a standard telephone thus enabling voice contact between each remote testing site and computer center to check the quality of communication link before the transmission of test data is initiated. In addition, appropriate power supplies (not shown in FIG. 1) suitably energize all the various electronic components of the above described testing and signal conducting portions of the invention system.

Referring now to FIG. 2, which represents a data processing center adapted for signal reception from conventional telephone lines 54, signals are received through appropriate data coupling means 55 and are fed into a modem 56 adapted to demodulate incoming data signals from the carrier voltage. The demodulated signal next passes through a digital U.A.R/T 49 which is adapted to divide the incoming serialized data into separate information channels, and to check the parity bit to determine whether the signal received has been accurately transmitted and has not lost any constitutent information characters. The subsequent data signals are now fed into a programmable digital computer 60 having bulk storage capabilities which preferably include a memory bank 61 and integrated tape or disk storage means 62, as well as associated printer means 63 adapted for alpha-numeric printing and cataloging of computed results. Computer responses and commands are transmitted to each remote hearing test location in a reverse sequence from the above. In the reverse direction of signal transmission U.A.R./T 57 acts to serialize the separate channels of data coming from computer 60 and transmit the serialized data via aforementioned signal conditioning means, at each remote test location and into control logic circuitry 12 to initiate execution of appropriate operations. In this respect, bidirectional communication beween the various remote testing locations and the data processing center is utilized.

As previously mentioned, accuracy of transmitted data is continuously checked by parity bits serialized into each set of data by U.A.R/T 49. The parity character which is transmitted is adapted to record either the even or odd numbered total of information characters in each set or train of data, by recording even with an 0 and odd with a 1. This figure is transmitted to the data processing center along with the test data whereupon it is compared by computer 60 with the total even or odd number of characters received. If the two numbers are identical and no further tests for transmission accuracy are required, the computer temporarily accepts the information. If the two numbers are not identical, however, computer 60 requests the information again. Since the entire lateral parity verification process is accomplished in a small fraction of a second, inaccurate data due to transmission errors, i.e., storms, loose connections, etc., can usually be recovered. If the data cannot be resampled, computer 60 will send a command to the remote testing location logic circuitry 12 to reset the test sequence for the last frequency tested, and will subsequently resample the data.

In addition, longitudinal parity verification of transmitted data, that is, verification that all individual bits of information have been correctly transmitted and received and that no bit has been lost during data transmission, is accomplished through the use of an adding device 64 (shown in FIG. 1), located at each remote testing site, which is adapted to compute the sum of all bits of information in each set or train of data being transmitted, and to include the sum total as in a separate character which is subsequently compared with the computed total of the number of bits received at the data processing location. As in the case of lateral parity, computer 60 is adapted to accept valid data, lost, or if unrecallable, will reset the test sequence for the last frequency tested, and proceed again.

In addition to the foregoing parity tests for data transmission accuracy, the present invention in the first FIG. 1 embodiment provides means for remotely measuring frequency and sound pressure level accuracy, signal cross talk between earphones, harmonic distortion, and ambient noise levels in the immediate vicinity of the testing area.

Figure 7:
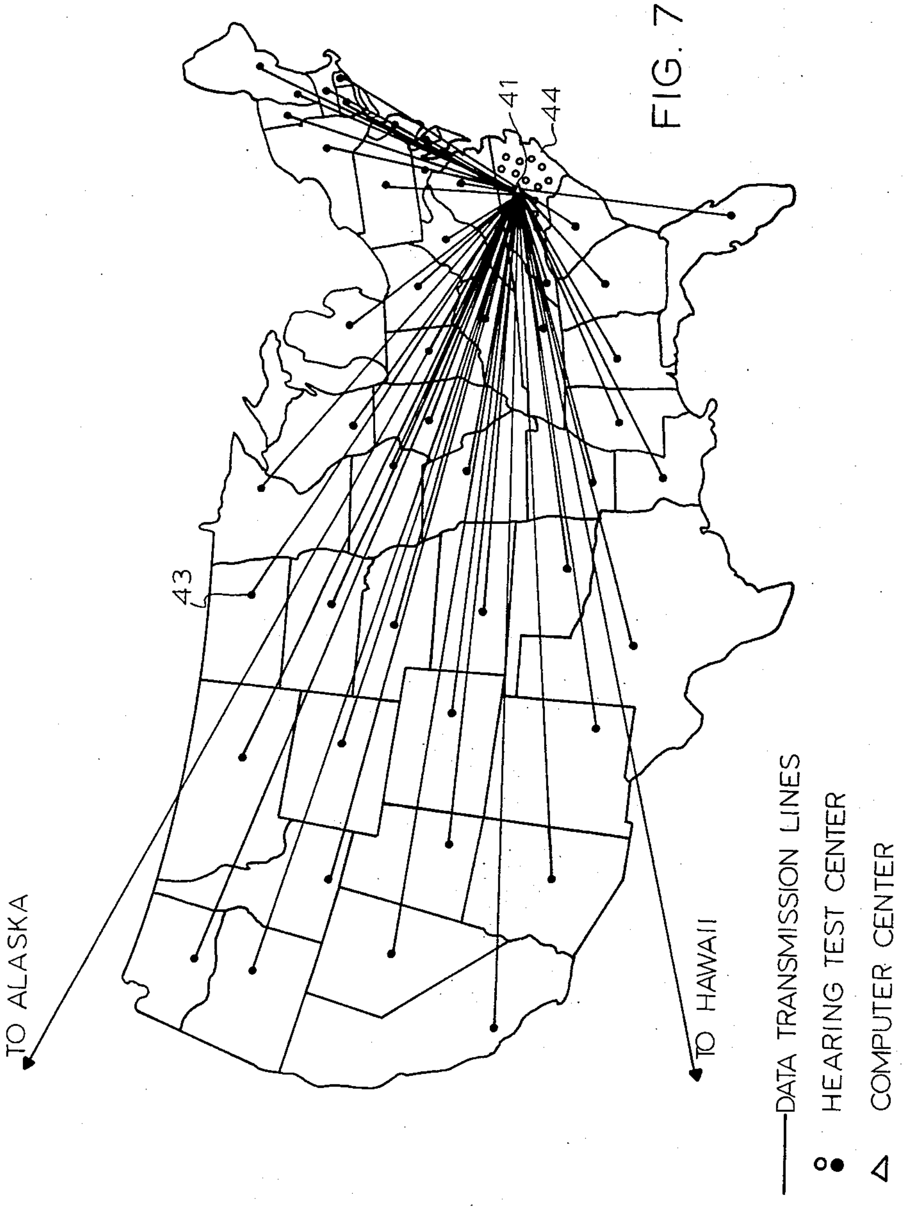
FIG. 7 is a map illustrating how the system of the invention may be applied geographically.

In accordance with the first embodiment of the present invention, a simple audiometric screening system utilizing telephone lines, for example, to transfer data from a plurality of remote testing locations to a data processing location 41, is shown superimposed on a map of the continental United States in FIG. 7. Means are provided for the testing of hearing at. for example, one hearing test center indicated by solid dots 43 in each state or preferably at plural test centers indicated by circles 44 in every state. A "test center, " as recited above, does not necessarily connote a permanent facility, but can be suitably located anywhere a telephone is presently installed and operational, and wherein reasonably quiet surroundings are either already available or can be provided. As is readily apparent, a hearing testing system as herein described may be extended anywhere a long distance telephone call can be made with reasonably good signal transmission qualities.

CALIBRATION APPLICABLE TO BOTH EMBODIMENTS BUT PARTICULARLY FIRST EMBODIMENT

When considering calibration of audiological devices, accurate frequency and sound pressure level are perhaps the two most important calibration parameters to check. In this capacity, the present invention provides means adapted to measure both frequency and sound pressure level accuracy at each remote testing location, and transmit the measured results to the distantly remote data processing center described above. If calibration measurements received by the data processing center exceed predetermined inaccuracy limits, appropriate instructions to terminate the test sequence is sent to the respective discalibrated remote testing device. In an alternate form of the invention system, compensation for the above calibration error is remotely programmed by computer 60 into the test sequence of the discalibrated test device, thus enabling the system to always remain in a state of calibration.

Referring more specifically to FIG. 1, a digital frequency counting device 15 is adapted to count, for a duration of one second, the number of cycles or Hertz for a given audio signal. Suitably, the varous frequencies presented to an examinee during a hearing test sequence are adapted to be fed through counter 15 for a duration of one second for each tone. Apropriate instructions for energizing counter 15 and feeding the various test tones into the counter, are programmed at the data processing center (FIG. 2) and are remotely executed by control logic circuitry 12.

Figure 4:
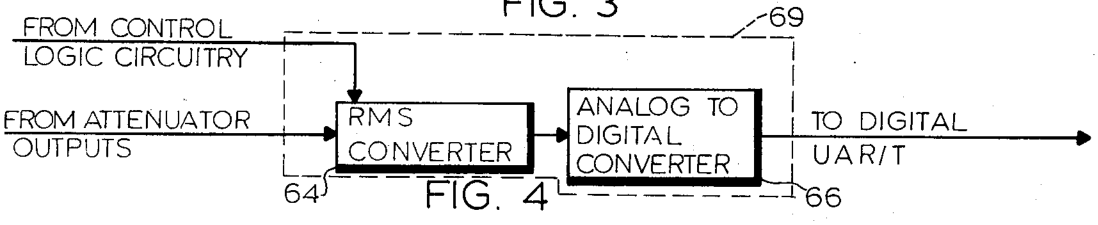
FIG. 4 is a schematic diagram of a signal output level measuring circuit used in the system of the invention.

Also shown in FIG. 1 in generalized block form is a circuit 69 adapted to measure voltage levels being input to each analog programmable attenuator 22 at 33. Referring now to FIG. 4. the above output signal, which corresponds to the actual sound pressure level being proudced in earphones 30, is fed into an R.M.S. or root mean square converter 64, and the resultant R.M.S. voltage is fed through an analog to digital converter 66 and into digital U.A.R/T49 for subsequent transmission to the remote data processing location. As in the case of the above described remotely executed frequency calibration check, a computer program or subroutine of computer 60 is adapted to initiate a command sequence through control circuitry 12 which executes the calibration check. In the case of attenuator output level measurement, each attenuating device 22 is adapted to emit two separate output levels at a constant frequency as programmed. From the two levels, the remote data processing location is able to determine the accuracy of the attenuated signals, as well as the functional slope between the various attenuated levels to ensure the absolute, as well as linear accuracy of each attenuating device 22. That is, to ensure that the respective measured attenuated levels are accurate, that the attenuator smoothly and linearly initiates an increase or decrease in sound intensity in response to examinee operable switch 245. Such measurement also serves as a general measurement that the data transmission system is functioning properly.

In order to further ensure the accuracy of the hearing test, it is necessary to conduct the test in quiet surroundings in order that the examinee does not confuse test tones with extraneous environmental noise. Moreover, any background noise will tend to mask test tones which are only slightly above the examinee's hearing threshold level, causing him to respond to the increasing signal later than he would otherwise, and thus giving him a slightly greater score for hearing loss than he actually has. Ambient nosie in the immediate vicinity of the testing location should therefore be regularly monitored. If its exceeds a predetermined sound pressure level which would tend to mask the test tones being presented the test sequence should be stopped or the operator notified until the nosie is abated. Otherwise, the hearing test may be invalid.

In addition to consideration of ambient noise, harmonic distortion of the test tones should be periodically measured. It is well-known that audio tonal signals carry harmonic tones which are generally an octave or several octaves higher than the original or fundamental tone. In a hearing test, for example, an examinee may be listening for a test tone without knowledge of the exact frequency of the tone. If, for example, the test tone is 3000 Hertz and his hearing threshold at this low frequency is very poor, while for higher frequencies is very good, instead of responding to the 3000 Hertz signal, he may in fact respond to a harmonic, e.g., 6000 Hertz, of the fundamental tone if harmonic distortion is present to an appreciable extent. This type of reaction would constitute a false response which would normally go undetected. As will be later described, the present invention readily provides means to periodically check each remote testing location for harmonic distortion, as well as to continuously monitor each testing location for excessive ambient noise levels.

Another factor which must be checked in order to obtain calibration accuracy for any audiological apparatus is signal cross talk between earphones. Signal cross talk occurs when a signal normally being produced in only one earphone is leaked, through induction, bad connections, etc., into the opposite earphone. If, for example, an examinee's hearing is substantially worse in the particular ear being tested than in the opposite ear receiving signal cross talk, a false response might again result and similarly go undetected.

In addition to the above, a frequency calibration check is remotely accomplished through the energization of a one second frequency counter 16. Under command of the remote computer a sequence of frequencies is sampled for accuracy at a test station and the results measured by frequency counter 15 are relayed back to the computer. If frequency error exceeds a predetermined bound, an appropriate indication may be sent to the remote test station. Frequency may then be remotely re-adjusted by trimming potentiometers 288 on voltage divider 283 (FIG. 26) until a subsequent frequency calibration check revels a correct state of frequency calibration.

Figure 3:
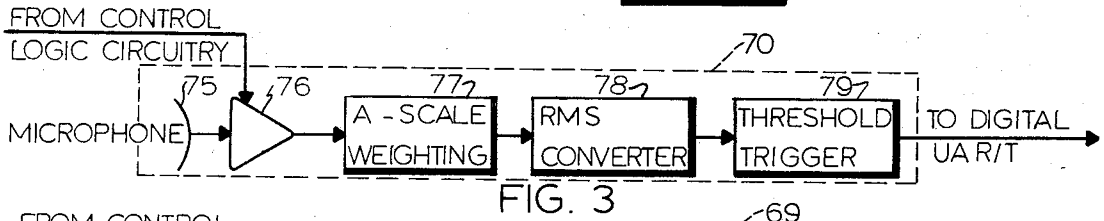
FIG. 3 is a schematic diagram of an ambient noise measuring circuit used in the system of the invention.

The only additional calibration parameter usually checked in audiological devices is signal rise time, or the amount of time during which a test tone rises to each predetermined amplitude level. A rise time which is too brief will be characterized by a sharp "click" while a rise time that is too long could result in the output amplitude not reaching its final value for long enough time for the examinee to react or prior to being cut off by the tone interrupter. The present invention in this capacity does not contemplate the need to measure signal rise time along with other calibration parameters which need to be periodically checked, due to the utiliztion of precision electronic solid state attenuating devices. These devices only seldom require recalibration past the time of initial component installation, whereas the electromechanical attenuators, potentiometers, relays and the like, used in virtually all previous audiological testing apparatus have required frequent recalibration. Referring again to FIG. 1, shown in generalized block form are circuit 70, adapted to measure the amount of ambient noise in the immediate vicinity of the remote testing site; circuit 71, adapted to measure harmonic distortion of the test tones; and circuit 72, adapted to measure signal cross talk between earphones. Referring more specifically to FIG. 3, an amibent noise measuring circuit 70 according to the invention comprises a suitable microphone 75, connected to an amplifier 76, adapted to emit an audio output signal having gain characteristics, and to which is connected an A-scale weighting device 77, adapted to equalize the various frequencies monitored through microphone 75. The resultant signal next enters an R.M.S. or root mean square converter 78 adapted to yield an R.M.S. measurable voltage output, and finally a threshold triggering device 79 which may suitably be a Schmitt type trigger, and which is adapted to emit a warning signal through digital U.A.R/T 49 to computer 60 when a predetermined sound pressure constant, set in said trigger, has been exceeded. The warning signal will initiate a return command procedure from computer 60 to control logic circuitry 12 which is adapted to interrupt the test sequence until the ambient noise level is abated.

Figure 5:
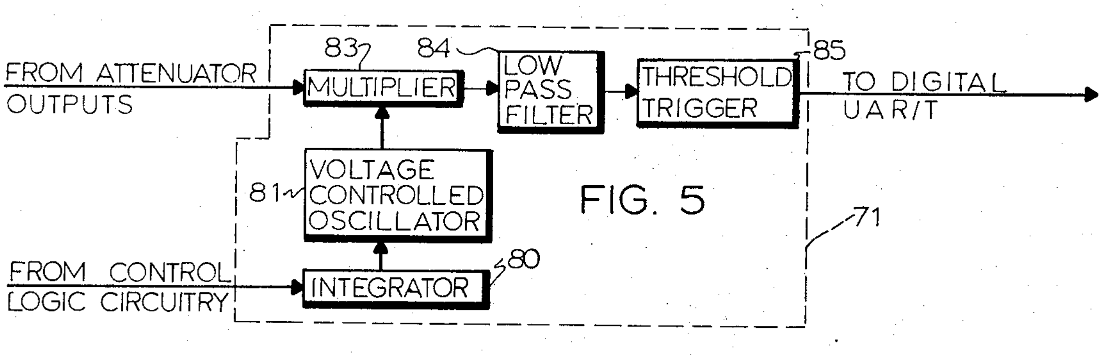
FIG. 5 is a schematic diagram of a harmonic distortion measuring circuit used in the system of the invention.

Referring now to FIG. 5, a harmonic distortion measuring circuit 71 according to the invention comprises an integrator 80, adapted to receive command signals from control logic circuitry 12; a voltage controlled oscillator 81 adapted to generate variable frequencies in response to varying voltages being output from integrator 80; a multiplier 83, adapted to cross multiply audio signals incoming from the respective programmable attenuator outputs at E (see FIG. 1), with the signals being emitted by voltage controlled oscillator 81, as it is increasingly and decreasingly swept, in order to obtain a product having a direct current voltage term proportional to either the fundamental tone presented by oscillator 14 through attenuator 22, or a harmonic of said tone. A low pass filter 84 is adapted to eliminate the sinusoidal high frequency component leaving a resultant signal voltage proportional to the degree of harmonic distortion present. if this voltage exceeds a predetermined limit set in threshold trigger 85, an appropriate warning signal is sent to computer 60 through digital U.A.R/T 49. A subsequent return signal from computer 60 informs the operator via operator input and visual display 13 of the state of discalibration.

Figure 6:
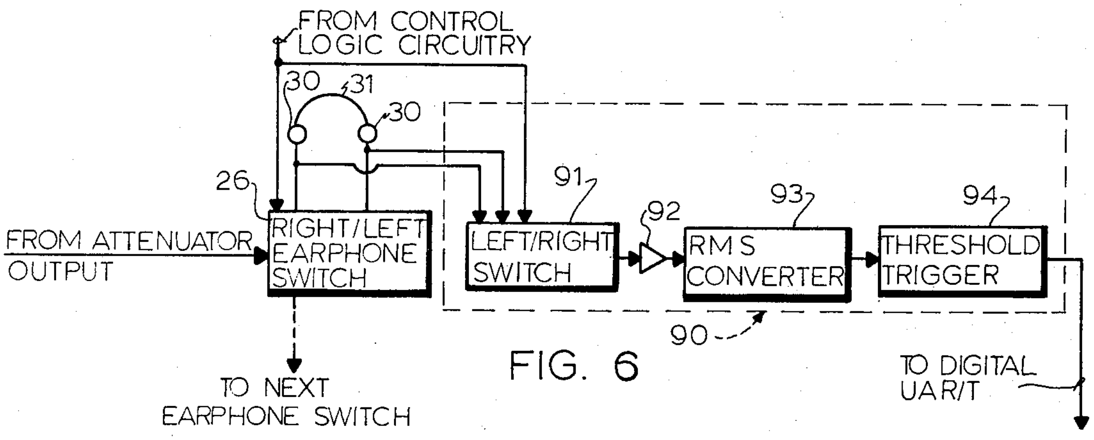
FIG. 6 is a schematic diagram of a signal cross talk measurement circuit used in the system of the invention.

Referring next to FIG. 6, a signal cross talk measurement circuit 72 assembled in accordance with the first embodiment of the invention, and generally represented in FIG. 6 within dashed lines 90, comprises a left/right earphone switch 91 in parallel connection with right/left earphone switch 26, and is adapted to communicate the earphone, opposite the one producing test tones, with a suitable amplifier 92. Appropriate signals from control logic circuitry 12 are adapted to initiate the test for signal cross talk. If signal cross talk is present, the output signal from amplifier 92, having increased gain characteristics, passes through an R.M.S. converter 93, and into a suitable threshold triggering device 94. If the signal entering threshold trigger 94 exceeds a predetermined magnitude, an appropriate signal indicating a state of cross talk discalibration is sent to computer 60 through U.A.R./T 49. A return signal is adapted to indicate the state of discalibration through operator input and visual display 13.

From the foregoing, it is apparent that the present invention has the unique advantage of providing readily available checks on virtually all calibration parameters which have in the past required that audiological testing apparatus be taken to a service center for extensive and time consuming bench testing. Each separate calibration check, as outlined above, becomes an integral portion of a computer subroutine, stored in computer 60 and which may be executed at will, yielding accurate results within seconds. It is now possible for a complete calibration check, including frequency, sound pressure level, signal cross talk, harmonic distortion, and ambient noise, to precede each hearing test given at each remote testing center. Furthermore, in the event of equipment malfunction or failure, the aforementioned utilization of printed circuit cards containing key earphone control components 45, for example, enables prompt, on-location replacement of defective components. In addition, in an alternate embodiment of the invention system, since sound attenuation is now a programmable function, depending only on the amounts of voltage supplied, suitable compensation for discalibrated remote attenuators is readily made back at the data processing location by means of compensatory computer programs wherein the amount of calibration error is calculated and signal, adapted to remotely add or delete a compensating voltage quantity, is sent to the remote discalibrated instrument. Thus, immediate remote measurement as well as correction of attenuator output level calibration errors is now possible.

OPERATION USING FIRST EMBODIMENT AS BASIS OF DESCRIPTION

The administration of a hearing test at each test center proceeds as each remote audiological testing apparatus is energized through operator input 13 of FIG. 1. The data processing center is contacted by telephone to establish a communications link, and the data coupling devices are switched to a data mode of operation. A request for a calibration check is now sent to the data processing location by appropriate operator input controls 13 and following the performance of subsequent calibration checks by computer 60 the system is placed in a ready situation.

Figure 29:
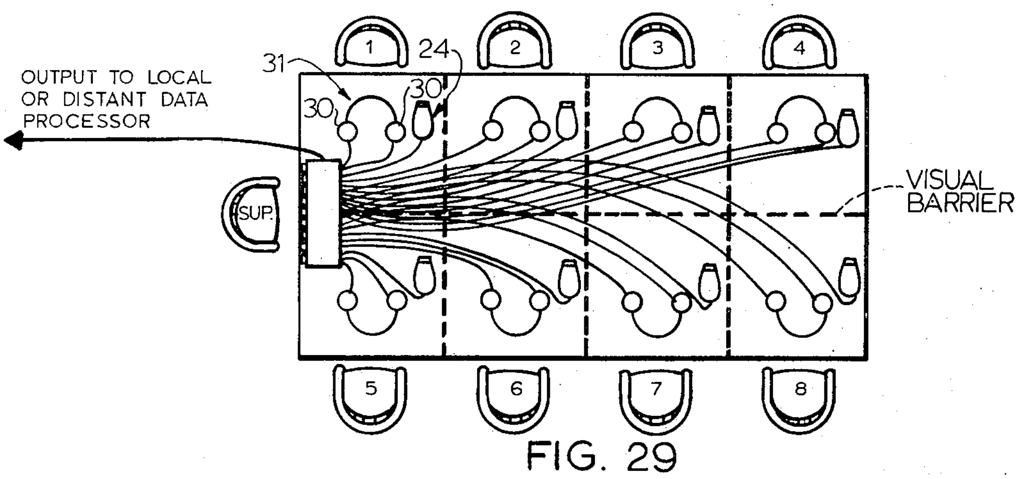
FIG. 29 is a schematic diagram showing a plurality of examinee test stations according to the first embodiment.

In preparation for the administration of a hearing test, a supervisor suitably locates the invention apparatus in a generally quiet environment. In an industrial plant, for example, this may be a conference room or office away from machinery and environmental noise. Next, plural sets of earphones 30 and control switches 24 are arranged as shown in FIG. 29 and are appropriately connected to the invention circuitry as illustrated in FIGS. 30 and 31. A group of examinees is next selected corresponding to the number of sets of earphones 31 and switches 24 which have been provided. Note here that the first embodiment contemplates several such group examinations at a plurality of separate test sites, as indicated in FIG. 7, on a geographically widespread basis.

In the present invention, it is contemplated that all pertinent data concerning the examinees to be tested will have been recorded in advance on data processing cards or entered into the computer by other well-known means. Each examinee is then seated in numerical order at the testing positions shown in FIG. 29, and the supervisor simultaneously places the data processing cards bearing the respective examinee data in like numerical order prior to entering the cards in seriatim into card insertion slot 11, FIG. 30. The supervisor next presses the reset button 39 which initializes the control logic circuitry 12 and simultaneously instructs the computer 60 to prepare to receive data. Once computer 60 is ready to receive data, it returns an appropriate signal adapted to illuminate "Ready" lamp 38, shown in FIG. 30. Next, the supervisor inserts the tabulation cards, still in numerical order corresponding to the seating position of the examinees, into card reading slot 11 of FIG. 30. Subsequent to insertion of an individual card, the "Read Card" button 34 is pushed energizing card reader 60 and causing the various data read to be sent to computer 60. The first card inserted is then withdrawn and a second card inserted until the last card has been read and withdrawn. The supervisor now places a pair of earphones correctly over the ear pinnae of each examinee and instructs each examinee, to grasp his respective control switch 24, and to watch for a visual indication from the supervisor that the test sequence is commencing. The supervisor will then press the "Test" button 46 of FIG. 30. This action indicates to the computer 60 that the invention apparatus is ready to begin the hearing test sequence. The computer 60 then initiates the test sequence by an appropriate instruction when it is ready to receive data. The last mentioned computer instruction is adapted to illuminate "Testing" lamp 32 and at the same time transfer control of the attenuators (see 22 in FIG. 1) from a 30 dB HTL holding level (see FIGS. 33) to control by the respective ramp voltage-controlling examinee switches 24. In addition, all counting devices are simultaneously started multiplexer 42 and A/D converter 47, in FIG. 1, are caused to begin stepping and converting data to digital form, and a first test frequency of 500 Hertz is caused to be pulsingly generated in all left earphones 30. All such instructions, of course, are given remotely.

As previously mentioned, a series of six different test frequencies comprising, for example, 500 Hz, 1000 Hz, 2000 Hz, 3000 Hz, 4000 Hz and 6000 Hz are sequentially produced in all left earphones 30 at 32 second intervals each, then the sequence is repeated in the right earphone 30 and an additional 1000 Hz signal is produced following the 6000 right ear test frequency, to serve as a comparison check on those persons attempting to produce false responses. During the presentation of the test sequence the various examinees individually respond to the test tones by pressing the respective control switches 24 when the tone is audible and releasing the control switches when it is inaudible. The operation of the various control switches 24 is intermittently monitored and sent to the computer 60 where it is temporarily stored during the test sequence.

At any point during the test sequence a supervisor may invalidate an individual hearing test or that of the whole group in the event of malfunction, unexpected excessive noise, etc., by operation of abort switches 43 (see FIG. 30).

In a preferred form of test sequence a first frequency of, say, pulsating 500 Hertz is fed into one ear and is adapted to gradually increase in amplitude until it becomes audible to the test subject. As stated elsewhere, a pulsating rhythm is employed because it has been found experimentally to permit more accurate test results. The tonal pulsations appear to be easier to discern than a steady tone just at the threshold of audibility. In an alternate embodiment of the invention a steady tone may, of course, be utilized as desired through the omission of the invention tone interruptor 18. Just at the point of hearing the tone, a threshold of audibility, the various test subjects respectively depress the control switches 24 until the signal is once again inaudible. If an examinee does not press the switch upon hearing the signal, the signal will continue to gain in amplitude at a predetermined rate until the upper bound, or unattenuated sound pressure level, is attained. See FIGS. 32, 33 and 34. The unattenuated level may be limited to a sound pressure level which will not be damaging to the ear, in the event that the examinee does not press his control switch, by selection of the component parameters incorporated into each programmable atenuator 22. The operation of waiting for the signal to become audible, depressing the switch at the instnat of audibility, and releasing the switch at the instant of inaudibility once again, is equivalent to one cycle of rising and falling control voltage generated by integrator 23, and is repeated at each subsequent frequency to establish a hearing threshold range at each selected frequency for the respective ear being tested. Accordingly, at predetermined time intervals the test sequence is adapted to automatically switch to the next frequency, while testing resumes in the same ear as the various examinees again regulate the increase or decrease in the sound pressure level of the test tones. The procedure continues through a fixed number and order of test frequencies until a predetermined point is reached which initiates, through control logic circuitry 12, activation of solid state switch 26 thereby switching the test tones to the opposite earphone. Testing proceeds as in the case of the first ear tested until the completion of the test sequence, which activates a reset procedure adaptd to initialize the test sequence for the next use. While testing is being conducted at each separate testing location, varying cycles of control voltages regulating each programmable attenuator 22 (see 33, FIG. 1) are continually sampled, digitized, serialized and transmitted to the computer. In addition, data is continuously monitored for transmission accuracy by the aforementioned lateral and longitudinal parity checks.

Once the test sequence has ended, the "End Test" lamp 29 (see FIG. 30) is illuminated informing the supervisor that the computer is ready to compute the data. In keeping with the objects of the present invention, inaccurate or inconsistent data received by the computer 60 will not be tabulated. Instead, the examinee station wherefrom said inaccurate data originated will be invalidated and treated as an "Empty" station by the computer. A subsequent depression of "Accept" button 27 causes computer 60 to begin a processing the data. Once the numerical results have been printed computer 60 is adapted to automatically reset the entire invention testing apparatus for a new hearing test. Appropriately "Ready" lamp 38 is now illuminated and a new group of examinees is prepared.

Simultaneous with the termination of the test sequence and the subsequent reset thereof, a command signal is sent from the controls circuitry 12 (FIG. 1) through U.A.R/T 49 in the form of a unique character, unlike test data characters, which is serialized along with the data characters already being transmitted, and is adapted to initiate computation of the test data and printout thereof at the data processing center. Provision is made to differentiate between incoming test data from different remote testing locations, as well as from different examinees at each separate testing location through previously mentioned card reader means 50.

Thus, separate data signals are bidirectionally transmitted corresponding to the execution commands of the test sequence, and to the actual responses of each test examinee. The first embodiment of the present invention therefore has the advantage of providing highly accurate test results from a multiplicity of distantly remote testing locations while providing a means for the rapid collection and evaluation of said test results. In a preferred form of the invention system, selected computer algorithms may be used to evaluate the test daa and provide diagnostic recommendations, or alternately selected hearing test resuls may be compared by the computer with a predetermined norm, representing a person with average hearing. Deviations from the norm can accordingly be automatically separated and analyzed for trends. Furthermore, the computer program which analyzes, categorizes, and compares the test results is prepared under the supervision of an audiologist. No human intervention is subsequently required to analyze the final computed data which may represent an extremely large number of tested individuals.

As an auxiliary portion of the hearing test sequence, the present invention contemplates short presentation of an instruction lecture or film or use of a simulator resembling the instant invention tone generator attenuator earphones and push buttons, teaching the correct operation of the invention apparatus to each group of examinees prior to the administration of a plural hearing test. The utilization of such a presentation appears to effectively avoid misunderstandings during the actual hearing test which would normally invalidate the scores. An examinee whose scores are repeatedly invalidated by a supervisor or the computer may require personal instruction in the correct use of the apparatus, or clinical analysis by a certified audiologist.

While additional detailed description could be given concerning operation of the second embodiment as generally set forth in FIG. 23, those skilled in the art will readily appreciate the distinctions between operation of the two embodiments. Therefore, the second Hz operation (This not discussed any more specifically beyond what has already been stated.

Computer program parameters capable of effecting the various hereinbefore described audiometer control functions employed by this invention are deemed well within the established computer programming art and do not require further elaboration. Mention should be made, however, of the computer test score analysis criteria contemplated for use with the present invention.

As an example computer algorithm, test subjects in a predominantly industrial environment will be classified by the computer on the basis of their hearing test scores into four categories defind by Classes I through IV listed below. Note that Class I indicates those persons deemed to have normal hearing. Class II indicates those persons with only moderate or beginning high frequency hearing loss and who would not be eligible for compensation in most states. Class III indicates impairment of hearing in frequencies vital to understanding speech. Such test subjects should be referred to a physician or audiologist (or both) for a more thorough diagnostic examination. Class IV indicates a group requiring retesting due to an illogical pattern of responses such as a response envelope greater than 20 dB.

The criteria for the program algorithm may be more specifically stated as follows:

Class I — Normal — There is no loss greater than 25 dB from 500 to 6000 Hz. (This Class II — High Frequency Loss — The loss is greater than 25 dB above 2000 Hz, but no infringement is greater than 25 dB within the 500–2000 hz range. (Tis loss is characterized by acoustical trauma and noise induced hearing loss with the above limits.) It is not compensable.

Class III — Significant Loss — Loss is greater than 25 dB within 500 to 2000 Hz and elsewhere. It is usually compensable.

Class IV — Any class where envelope is greater than 20 dB.

Other program parameters such as storage and retrieval criteria for individual test subjects are indicated below as examples. Different program parameters will doubtless appear to those skilled in the art who employ the instant invention to carry out specific hearing test objectives. More specifically, the storage and retrieval criteria is stated as follows:

Speech Average Loss (SAL) is the average loss in dB for each ear at 500–2000 Hz. Assign a letter for left and right ear from following table:

A—16 dB or less — Normal
B—17–30 dB — Near Normal
C—31–45 dB — Mild loss
D—46–60 dB — Serious loss
E—61–90 dB — Severe loss
F—91+ dB — Profound loss A significant change will be one letter change from the previous test.

Noise Induced Loss (NIL) is calculated at 4000 Hz from the following table:

A—8 (or less) dB — Normal
B—9–14 dB — Normal — Good
C—15–22 dB — Normal — within expected limits
D—23–29 dB — Suspect NIL
E—30+ dB — Strong indication of NIL A significant change will be one letter change from the previous test.

With high quality earphones the invention circuitry described can be expected to produce reasonably accurate results. However, it is known that earphone efficiency varies with frequency and the prior art has taught frequency equalization circuits to maintain some predetermined efficiency at all frequencies. In order to compensate for earphone deficiencies and the Fletcher-Munson curve a table of predetermined values is entered into the computer memory which converts the sound pressure levels measured from the earphones to the appropriate hearing threshold levels. When such a computer memory is employed the level shifting circuit shown in the previously referred to copending audiometer application Ser. No. 315,173 is not needed.

GENERAL SUMMARY OF ADVANTAGES

From the foregoing, it is apparent that the present invention advantageously provides both a method and system capable of simultaneously testing the hearing of either a single or an extremely large number of individuals situated at a plurality of distantly remote and separately located testing sites. Means are provided for the rapid and accurate accumulation and computation of the hearing test results at a separate remotely located data processing center for subsequent analysis. In this respect, the present invention has the advantage of testing a substantially large number of individuals per only small number of trained personnel involved. Furthermore, as has been shown, the test results are highly accurate and the system possesses calibration features which adapt the invention to completely remote, continuous operation with few interruptions due to calibration adjustments. In addition, due to the virtual elimination of moving parts, i.e., electromechanical potentiometers, relays, rheostats and the like, administration of a typical hearing test proceeds in the absence of spurious system-generated noise, such that only the clear test tones are heard by the examinee. The transmitted test responses are always monitored for accuracy, ensuring valid scoring by the computer. The present invention thus provides a system for testing hearing, which is extremely broad in scope, yet accurate in operation.

Based on the foregoing description, it is apparent that the present invention provides an effective means to test the hearing of singular as well as a plural number of persons simultaneously, and to transform the test data into computer intelligible results. The present invention has the further advantage of effectively eliminating the need for human interpretation of the test representative curves as has been the case in virtually all prior art hearing test scoring techniques. Furthermore, due to the elimination of moving parts, i.e.: electromechanical potentiometers, relays, rheostats, and the like, administration of a typical hearing test proceeds in the absence of system-generated acoustic noise, such that only the clear test tones are head by the examinee. It is readily apparent that the present invention therefore has the capacity for producing a substantially high degree of hearing test scoring accuracy, while testing individual as well as plural numbers of persons.

The various advantages cited above also obtain where the components of the invention system are localized rather than being geographically spread. Thus, where there is a long term need and concentrated group of persons whose hearing requires testing, the testing and computation components may be closely linked and with all the advantages obtained in the remote and geographically spread system.

What is claimed is:

1. An audiometer system adapted for computer control and simultaneous audiometric data recording for a singular or plural number of patients comprising, in combination:

a. a preselected number of audiometric patient test stations having at each station right and left earphones and a two position patient actuated switch;

b. programmably controllable right-left earphone switching means for each station connected to receive an audio signal and selectively direct the same to the right or left earphone at said station;

c. a programmably controllable signal source adapted to provide for each station and in some predetermined order a series of tone signals arranged in a fixed repeatable sequence, each tone signal in the series being of a selected aduio frequency, amplitude and period of duration;

d. a programmably controllable continuous control voltage source for each station productive of a ramp voltage wave controllable as to ascending and descending direction and representing a control voltage having maximum and minimum values when moved without interruption in either direction, said control voltage source being connected to a respective said two position switch and being adapted such that the direction of said ramp voltage wave may be interrupted and reversed in direction by the position of said two position switch at the selected station and the magnitude of the ramp voltage wave may be regulated in coordination with the particular patient's thresholds in said earphones;

e. programmably controllable circuit attenuator means for each station connected to said signal source to receive said tone signals and to said control voltage source to receive said ramp voltage wave, said attenuator means being adapted to generate therefrom for each respective station an audio output test signal having precisely controlled gain qualities in proportion to said control voltage and at the selected said frequency, said earphone switching means for each respective station being connected to receive said test signal;

f. pre-programmed control logic circuit means connected to programmably control said signal source, voltage source and earphone switching means for all the selected stations, said logic circuit means being connected to receive local commands under local manual control and remote commands under computer control from a supervisory and data collection station, whereby upon local manual actuation of a selection station, said signal and voltage sources for the selected station produce said tone signals and voltage wave and said earphone switch means switches under computer supervision wherein said patient at each such station hears first in one siad earphone and then in the other said series of signals and during the hearing of each tone signal in each respective earhpone the patient is enabled to move said two position switch to a first position when said tone signal is first heard and to a second position when said tone signal is lost to hearing and by so positioning said two position switch said patient is able to control both the direction of said voltage wave and the level achieved in each direction;

g. voltage developing means connected to each respective said voltage source and adapted to develop a voltage envelope for each respective patient which envelope directly corresponds to the earphone signal heard as determined by when and at what audio levels the said patient operates said two position switch;

h. analog to digital converter means adapted to convert said voltage envelope to digital data suited to be communicated remotely;

i. means for communicating said digital data in a recoverable form through a communicating medium to a said data collecting and supervisory computer station;

j. a collecting and supervisory computer station including means at said computer station to reconvert the communicated digital data into a form suited to a digital computer having storage, memory and printer means; and k. a digital computer at said computer station having storage memory and printer means and programmed to initiate and supervise said control logic circuit means and to receive and print out the data received therefrom whereby for each patient tested there is derived an audiometric test result in printed form in decibel loss terms proportional to the respective voltage envelope for the patient as determined by the manner in which the patient actuates said two position switch.

2. A system as claimed in claim 1 including at each test site having a said test station, means for measuring cross talk between each respective pair of earphones, said cross talk measuring means connected to said digital computer and said computer being programmed whereby upon the presence of excessive cross talk at any selected said test station the test results therefrom may be aborted.

3. A system as claimed in claim 1 including at each test site having a said test station, means for measuring harmonic distortion, said harmonic distortion measuring means being connected to said digital computer and said computer being programmed whereby upon the presence of excessive harmonic distortion at any selected said test station the test results therefrom may be aborted.

4. A system as claimed in claim 1 includng at each test site having a said test station, means for measuring ambient noise, said ambient noise measuring means being connected to said digital computer and said computer being programmed whereby upon the presence of excessive ambient noise at any selected said test station the test results therefrom may be aborted.

5. A system as claimed in claim 1 including at each test site having a said test station, means for measuring the relation of the respective voltage envelope and earphone sound pressure, said sound pressure measuring means being connected to said digital computer and said computer being programmed whereby upon the presence of inaccurate sound pressure at any selected test said station the test results therefrom may be aborted.

6. A system as claimed in claim 1 including at each test site having a said test station, means for measuring cross talk, harmonic distortion, ambient noise and sound pressure, said measuring means being connected to said digital computer and said computer being programmed whereby upon the presence of excessive said cross talk, harmonic distortion, ambient noise or inaccurate sound pressure at any selected said test station the test results therefrom may be aborted.

7. A system as claimed in claim 1 including at each test site having said test station, card reader means connected to transmit information therefrom to said computer and identify each patient in reference to a particular test station.

8. A system as claimed in claim 6 including at each test site having a said test station, card reader means connected to transmit information therefrom to said computer and identify each patient in reference to a particular test station.

9. A system as claimed in claim 8 wherein each said test station comprises one of a plural group of test stations having a common test site and common said logic circuit means and said computer is adapted to simultaneously supervise and record data from all said test stations at said common test site.

10. A system as claimed in claim 1 wherein each said test station comprises one of a plural group of test stations having a common test site and a common said logic circuit means and said computer is adapted to simultaneously supervise and record data from all said test stations at said common test site.

11. A system as claimed in claim 10 wherein said common test site constitutes one of a plurality of geographically widespread test sites and all said test sites are simultaneously supervised and in data communication with said computer.

12. A system as claimed in claim 1 wherein each said test station and said computer are located and closely connected at a common test site.

13. In an audiometer system as claimed in claim 1 including for eah said signal source at each said test station tone interruptor circuit means connected to interrupt and convert ssaid continuous tone signals into pulse form.

14. In an audiometer system as claimed in claim 1 wherein said control logic circuit includes for each test site having a said test station, manually operated reset circuitry means adapted to cause said tone signal sequence to be independently reset for each test site to a predetermined starting condition.

15. In an audiometer system as claimed in claim 1 wherein said system includes a plurality of said logic circuit means at a plurality of test sites and said computer is adapted to simultaneously reset all of said logic circuits to cause the respective said tone signal sequence to be reset for all such circuits.

16. In an audiometer system as claimed in claim 1 wherein each said right-left earphone switching means, signal source, voltage source, attenuator means and logic circuit means at each test site having a said test station comprise solid state components thereby adapting the same to function without mechanical motion.

17. In an audiometer system as claimed in claim 1 wherein each said signal source at each test site having a said test station comprises a voltage controlled oscillator and each corresponding said logic circuit means precisely controls the amount of voltage supplied said oscillator to control the corresponding said tone signal frequency.

18. In an audiometer system as claimed in claim 1 wherein each said circuit attenuator mans for each test site having a said test station incorporates circuitry for computing a signal representing the logarithm of said tone signal, for combining such logarithm signal and said ramp voltage wave, to produce the anti-log of such combination and from such anti-log to produce said tone signal.

19. In an audiometer system as claimed in claim 1 including ramp voltage wave conditioning circuit means adapted to cause the instantaneous slope of said ramp voltage wave to be steep at the onset of each said tone signal presentation and to continuously decrease said ramp voltage slope to a relatively gradual slope at the conclusion of each said tone signal.

20. In an audiometer system as claimed in claim 1 wherein each said logic circuit means for each test site having a said test station is programmed to cause said tone signal sequence to be heard through said earphone switching means first in one of said earphones and then in the other of said earphones.

21. In an audiometer means system as claimed in claim 1 wherein each said logic circuit means at each test site having a said test station includes cross talk circuit means connected to said earphones and adapted to selectively prevent one of said earphones from conducting a signal when the other of said earphones is being utilized for testing.

22. A system as claimed in claim 1 wherein said voltage source comprises a linear ramp wave generator and said output test signal is in linear proportion to said control voltage.

23. A system as claimed in claim 1 including for each said signal source at each test station tone circuit circuit means connected to interrupt and convert said continuous tone signals into pulse form, wherein said control logic circuit includes for each test site having a said test station, manually operated reset circuitry means adapted to cause said tone signal sequence to be independently reset for each test site to a predetermined starting condition, wherein said system includes a plurality of said logic circuit means at a plurality of test and and said computer is adapted to simultaneously rest all of said logic circuits to cause the respective said tone signal sequence to be reset for all such circuits, wherein each said signal source at each test site having a said test station comprises a voltage controlled oscillator and each corresponding said logic circuit means precisely controls the amount of voltage supplied said oscillator to control the corresponding said tone signal frequency, wherein each said circuit attenuator means for each test site having a said test station incorporates circuitry for computing a signal representing the logarithm of said tone signal, for combining such logarithm signal and said ramp voltage wave, to produce the anti-log of such combination and from such anti-log to produce said tone signal, ramp voltage wave conditioning circuit means adapted to cause the instantaneous slope of said ramp voltage wave to be steep at the onset of each said tone signal presentation and to continuously decrease said ramp voltage slope to a relatively gradual slope at the conclusion of each said tone signal, each said logic circuit means for each test site having said test station being programmed to cause said tone signal sequence to be heard through said earphone switching means first in one of said earphones and then in the other of said earphones, wherein each said logic circuit means at each test site having a said test station includes cross talk circuit means connected to said earphones and adapted to selectively prevent one of said earphones from conducting a signal when the other of said earphones is being utilized for testing.

24. The method of audiometric testing, comprising the steps:

a. assembling a selected number of patients at a predetermined number of test sites;

b. at each test site assigning each patient to a test location equipped with a pair of earphones and a two position switch;

c. connecting said earphones through an earphone selector switch to a local programmed signal source providing in some predetermined order under program control a series of tone signals arranged in a fixed repeatable sequence, each tone signal in the series being of a selected audio frequency, amplitude and period of duration;

d. connecting said two position switch to an electronic attenuator control having a connection to the signal source and being in the nature of a positive-negative amplifier controlled in direction by the position of said two position switch such that when the respective switch for such test location is in a first position the incoming tone tends to be positively amplified in a smoothly increasing manner until it reaches some predetermined maximum level unless the said patient switch before such maximum level is achieved is caused to assume a second position in which event the tone tends to be negatively amplified in a smoothly decreasing manner until it reaches some predetermined minimum level unless said patient switch before such minimum level is achieved is caused to be returned to said first switch position, said maximum level being below a predetermined threshold for the subject and said minimum level being at or below a normally inaudible threshold for the subject;

e. under program control operating said signal source and earphone selector switch while each said patient is allowed to move said two position switch to said first position when a selected tone frequency is first heard and to the second position when that frequency is lost to hearing;

f. during the test developing in said attenuator control, detecting and recording a voltage envelope for each patient the magnitude of which corresponds to the earphone levels heard as determined by when and at what amplification levels the respective said patient operates said two position switch;

g. converting said voltage envelope to digital data suited to be communicated to a computer;

h. communicating said digital data in a recoverable form through a communicating medium to a data collecting and supervisory computer station;

i. at said computer station reconverting the communicated digital data into a form suited to a digital computer having storage, memory and printer means; and j. utilizing a digital computer at said computer station, receiving and printing out the data received whereby for each patient at each said test station there is derived an audiometric test result in printed form in decibel loss terms proportional to the respective voltage envelope for the suhject as determined by the manner in which the subject actuates said two position switch.

25. The method of claim 24 including the step of interrupting each said tone signal to form the same into pulses.

26. The method of claim 24 including the step of computer monitoring the cross talk between the earphones and aborting the test results in the presence of excessive cross talk.

27. The method of claim 24 including the step of computer monitoring the harmonic distortion at the test site and aborting the test results in the presence of excessive harmonic distortion.

28. The method of claim 24 including the step of computer monitoring the ambient noise at the test site and aborting the test results in the presence of excessive ambient noise.

29. The method of claim 24 including the step of computer monitoring the relation of the respective voltage envelope and earphone sound pressure and aborting the test results in the presence of excessive sound pressure.

30. The method of claim 24 wherein said patients and sites are plural in number and including locating said sites at geographically widespread locations and linking each site to a central said computer through a long distance communication medium.

31. The method of claim 30 including the step of utilizing long distance telephone lines for said communication medium.

32. The method of claim 24 wherein said patients are plural in number, said number of sites constitutes a single site and including the step of locating said computer at said single site.

* * * * *

PO-1050
(5/69)

UNITED STATES PATENT OFFICE
CERTIFICATE OF CORRECTION

Patent No. 3,808,354 Dated April 30, 1974

Inventor(s) Michael D. Feezor and Mack J. Preslar

It is certified that error appears in the above-identified patent and that said Letters Patent are hereby corrected as shown below:

Column 4, line 62, "audiomatic" should be -automatic-.

Column 12, line 7, "freqeency" should be -frequency-.

Column 13, line 35, "Vhd k" should be -$V_k$-.

Column 14, line 56, "8" should be -q-.

Column 15, line 18, "Vhd Vat" should be -$V_L$ at-.

Column 15, line 21, "($V_c/R_{134}$)" should be --$V_c/R_{134}$-.

Column 15, line 25, "$IS_2$" should be -$I_{S_2}$-.

Column 15, line 25, "e(q/KT)" should be -e q/KT-.

Column 15, line 25, "$I_S$" should be -$I_{S_2}$-.

Column 17, line 31, the first appearance of "the" should be -a-.

Column 19, line 33, "tone" should be deleted and -increasing- should be inserted before "signal".

Column 19, line 36, "instant" should be deleted and -yields- should be inserted before "a".

Column 19, line 36, "change" should be deleted at the end of the line.

Column 23, line 55, "clip-flop" should be -flip-flop-.

Column 24, line 58, "mmanually" should be -manually-.

PO-1050
(5/69)

UNITED STATES PATENT OFFICE
CERTIFICATE OF CORRECTION

Patent No. 3,808,354 Dated April 30, 1974

Inventor(s) Michael D. Feezor and Mack J. Preslar

It is certified that error appears in the above-identified patent and that said Letters Patent are hereby corrected as shown below:

Column 26, line 64, "center" should be -enter-.

Column 28, line 50, "aslo" should be -also-.

Column 29, line 14, "Inductor" should be "Indicator-.

Column 29, line 49, "logical" should be -logic-.

Column 31, line 60, "64" should be -65-.

Column 32, line 16, the period after "at" should be a comma.

Column 32, line 64, the period after "Fig. 4" should be a comma.

Column 33, line 6, -logic- should be inserted after "control".

Column 33, line 19, "245" should be -24-.

Column 33, line 35, a comma should be inserted after "presented".

Column 34, line 3, "16" should be -15-.

Column 34, line 32, "Referring" should begin a new paragraph.

Column 35, line 6, "if" should be -If-.

Column 35, line 56, -a- should be inserted after "and".

Column 36, line 44, "60" should be -50-.

Column 36, line 62, "Figs. 33" should be -Fig. 33-.

Column 36, line 64, a comma should be inserted after "started".

PO-1050
(5/69)

UNITED STATES PATENT OFFICE
CERTIFICATE OF CORRECTION

Patent No. 3,808,354 Dated April 30, 1974

Inventor(s) Michael D. Feezor and Mack J. Preslar

It is certified that error appears in the above-identified patent and that said Letters Patent are hereby corrected as shown below:

Column 37, line 49, "instnat" should be -instant-.

Column 37, line 59, "as" should be -and-.

Column 38, line 18, "a" should be deleted before "processing".

Column 38, line 47, "daa" should be -data-.

Column 38, line 49, "resuls" should be -results-.

Column 38, line 66, after "test." the following sentence should be inserted. -A suitable training device is separately disclosed and claimed in copending application Serial No. 405,677, entitled "Audiometric Pretest Trainer", filed October 11, 1973, and to which reference is made.-

Column 39, line 10, "Hz" should be deleted and -embodiment- should be inserted.

Column 39, line 11, "(This" should be deleted and -is- should be inserted.

Column 39, line 40, "(This" should be deleted.

Column 39, line 43, "hz" should be -Hz-.

Column 39, line 44, "Tis" should be -This-.

Column 39, line 60, "500-2000 Hz" should be -500-1000-2000 Hz-.

Column 41, line 33, "aduio" should be -audio-.

PO-1050
(5/69)

UNITED STATES PATENT OFFICE
CERTIFICATE OF CORRECTION

Patent No. 3,808,354 Dated April 30, 1974

Inventor(s) Michael D. Feezor and Mack J. Preslar

It is certified that error appears in the above-identified patent and that said Letters Patent are hereby corrected as shown below:

Column 42, line 2, "selection" should be -selected-.

Column 42, line 7, "siad" in the first appearance should be -said-.

Column 42, line 9, "earhpone" should be -earphone-.

Column 42, line 21 "signal" should be -- levels --

Column 42, line 32, -data- should be inserted after "a".

Column 42, line 50, -being- should be inserted after "means".

Column 43, line 10, "test said" should be -said test-.

Column 43, line 52, "eah" should be -each-.

Column 43, line 54, "ssaid" should be -said-.

Column 44, line 15, "mans" should be -means-.

Column 44, line 35, "means" should be deleted.

Column 44, line 47, -said- should be inserted after "each".

Column 44, line 47, the first appearance of "circuit" should be -interrupter-.

Column 44, line 56, the first appearance of "and" should be -sites-.

Column 44, line 57, "rest" should be -reset-.

Column 46, line 23, "suhject" should be -subject-.

Signed and sealed this 29th day of October 1974.

(SEAL)
Attest:

McCOY M. GIBSON JR.
Attesting Officer

C. MARSHALL DANN
Commissioner of Patents